(12) United States Patent
Davis et al.

(10) Patent No.: US 7,605,221 B2
(45) Date of Patent: Oct. 20, 2009

(54) WEATHERABLE, THERMOSTABLE POLYMERS HAVING IMPROVED FLOW COMPOSITION

(75) Inventors: Gary C. Davis, Albany, NY (US); Brian D. Mullen, Mt. Vernon, IN (US); Paul D. Sybert, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 658 days.

(21) Appl. No.: 11/426,680

(22) Filed: Jun. 27, 2006

(65) Prior Publication Data

US 2007/0027271 A1 Feb. 1, 2007

Related U.S. Application Data

(63) Continuation-in-part of application No. 11/025,635, filed on Dec. 29, 2004, now Pat. No. 7,169,859, which is a continuation-in-part of application No. 10/307,873, filed on Dec. 2, 2002, now Pat. No. 6,861,482, which is a continuation-in-part of application No. 09/908,396, filed on Jul. 18, 2001, now Pat. No. 6,610,409, which is a continuation-in-part of application No. 09/368,706, filed on Aug. 5, 1999, now Pat. No. 6,306,507.

(60) Provisional application No. 60/134,692, filed on May 18, 1999.

(51) Int. Cl.
*C08G 77/14* (2006.01)

(52) U.S. Cl. .................. 528/26; 525/439; 525/446

(58) Field of Classification Search .................. 528/26; 525/439, 446
See application file for complete search history.

(56) References Cited

U.S. PATENT DOCUMENTS

| | | | |
|---|---|---|---|
| 3,030,331 A | 4/1962 | Goldberg et al. |
| 3,169,121 A | 2/1965 | Goldberg et al. |
| 3,207,814 A | 9/1965 | Goldberg et al. |
| 3,444,129 A | 5/1969 | Young, Jr. et al. |
| 3,460,961 A | 8/1969 | Young, Jr. et al. |
| 3,492,261 A | 1/1970 | Young, Jr. et al. |
| 3,503,779 A | 3/1970 | Young, Jr. et al. |
| 3,506,470 A | 4/1970 | Young, Jr. et al. |
| 3,686,355 A | 8/1972 | Gaines, Jr. et al. |
| 3,939,117 A | 2/1976 | Ueno |
| 4,001,184 A | 1/1977 | Scott |
| 4,127,560 A | 11/1978 | Kramer |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,286,083 A | 8/1981 | Kochanowski |
| 4,308,406 A | 12/1981 | Takenaka et al. |
| 4,334,053 A | 6/1982 | Freitag et al. |
| 4,482,694 A | 11/1984 | Freitag et al. |
| 4,487,896 A | 12/1984 | Mark et al. |
| 4,503,121 A | 3/1985 | Robeson et al. |
| 4,506,065 A | 3/1985 | Miller et al. |
| 4,576,842 A | 3/1986 | Hartsing et al. |
| 4,600,632 A | 7/1986 | Paul et al. |
| 4,617,368 A | 10/1986 | Freitag et al. |
| 4,663,413 A | 5/1987 | Ward et al. |
| 4,681,922 A | 7/1987 | Schmidt et al. |
| 4,948,864 A | 8/1990 | Imai et al. |
| 4,963,595 A | 10/1990 | Ward et al. |
| 4,973,652 A | 11/1990 | Ebert et al. |
| 4,992,322 A | 2/1991 | Curry et al. |
| 4,994,532 A | 2/1991 | Hawkins et al. |
| 5,321,114 A | 6/1994 | Fontana et al. |
| 5,322,882 A | 6/1994 | Okamoto |
| 5,360,861 A | 11/1994 | Campbell |
| 5,451,632 A | 9/1995 | Okumura et al. |
| 5,455,310 A | 10/1995 | Hoover et al. |
| 5,488,086 A | 1/1996 | Umeda et al. |

(Continued)

FOREIGN PATENT DOCUMENTS

| EP | 0 254 054 | 6/1987 |
|---|---|---|
| EP | 0376052 | 12/1989 |
| EP | 0 434 848 | 7/1990 |
| EP | 0 517 927 | 12/1991 |
| EP | 0 524 731 | 6/1992 |
| GB | 2 043 083 | 3/1997 |

(Continued)

OTHER PUBLICATIONS

ASTM D 1003-0 "Standard Test Method for Haze and Luminous Transmittance of Transparent Plastics" pp. 1-6.

(Continued)

*Primary Examiner*—Margaret G Moore

(57) ABSTRACT

A copolymer composition comprises a polysiloxane block of Formula XIX or XXII, having 4 to 50 siloxane units, and a polyarylate-polycarbonate block consisting essentially of 50 to 99 mol % arylate polyester units and 1 to 50 mol % aromatic carbonate units, wherein 1 to 30 mole percent of the aromatic carbonate units are resorcinol carbonates, and 0 to 35 mol % of the aromatic carbonate units are bisphenol carbonates; wherein the sum of mole percentages of arylate polyester units, and aromatic carbonate units is 100 mol %; the polysiloxane blocks connect to an arylate ester unit, and/or an aromatic carbonate unit; the siloxane units of the polysiloxane block are present at 0.2 to 10 wt % based on weight of the copolymer composition; and a molded article of 3.2±0.12 millimeters thickness and consisting of the copolymer composition has a percent transmittance greater than or equal to 70%, according to ASTM D1003-00.

19 Claims, No Drawings

U.S. PATENT DOCUMENTS

| | | | |
|---|---|---|---|
| 5,510,182 | A | 4/1996 | Fontana et al. |
| 5,510,414 | A | 4/1996 | Okamoto et al. |
| 5,530,083 | A | 6/1996 | Phelps et al. |
| 5,608,026 | A | 3/1997 | Hoover et al. |
| 5,616,674 | A | 4/1997 | Michel et al. |
| 5,714,567 | A | 2/1998 | Idage et al. |
| 5,807,965 | A | 9/1998 | Davis |
| 5,821,322 | A | 10/1998 | Brunelle et al. |
| 5,916,997 | A | 6/1999 | Webb et al. |
| 5,932,677 | A | 8/1999 | Hoover et al. |
| 6,072,011 | A | 6/2000 | Hoover |
| 6,143,839 | A | 11/2000 | Webb et al. |
| 6,252,013 | B1 | 6/2001 | Banach et al. |
| 6,265,522 | B1 | 7/2001 | Brunelle et al. |
| 6,291,589 | B1 | 9/2001 | Brunelle et al. |
| 6,294,647 | B1 | 9/2001 | Brunelle et al. |
| 6,306,507 | B1 | 10/2001 | Brunelle et al. |
| 6,346,597 | B1 | 2/2002 | Banach et al. |
| 6,410,620 | B2 | 6/2002 | Shakhnovich |
| 6,414,058 | B2 | 7/2002 | Shakhnovich |
| 6,417,253 | B1 | 7/2002 | Shakhnovich |
| 6,500,549 | B1 | 12/2002 | Deppisch et al. |
| 6,559,270 | B1 | 5/2003 | Siclovan et al. |
| 6,572,956 | B1 | 6/2003 | Pickett et al. |
| 6,596,843 | B2 | 7/2003 | Brunelle et al. |
| 6,607,814 | B2 | 8/2003 | Pickett et al. |
| 6,610,409 | B2 | 8/2003 | Pickett et al. |
| 6,657,018 | B1 | 12/2003 | Hoover |
| 6,723,864 | B2 | 4/2004 | Silva et al. |
| 6,833,422 | B2 | 12/2004 | Silva et al. |
| 6,861,482 | B2 | 3/2005 | Brunelle et al. |
| 6,870,013 | B2 | 3/2005 | Silva et al. |
| 2003/0105226 | A1 | 6/2003 | Cella et al. |
| 2003/0207123 | A1 | 11/2003 | Brunelle et al. |
| 2004/0039145 | A1 | 2/2004 | Silva et al. |
| 2004/0220330 | A1 | 11/2004 | DeRudder et al. |
| 2005/0032988 | A1 | 2/2005 | Silva et al. |
| 2005/0159577 | A1 | 7/2005 | Davis et al. |

FOREIGN PATENT DOCUMENTS

| | | |
|---|---|---|
| WO | WO 80/00084 | 1/1980 |
| WO | WO 00/26275 | 5/2000 |
| WO | WO 2004/076541 | 9/2004 |
| WO | 2006071682 | 7/2006 |

OTHER PUBLICATIONS

ASTM D 256-04 "Standard Test Methods for Determining the Izod Pendulum Impact Resistance of Plastics" pp. 1-20.

Cohen, et al. "Transparent Ultraviolet—Barrier Coatings" Journal of Polymer Science: Part A-1. vol. 9, 3263-3299 (1971).

DE 1927938 Human Translation of German Patent.

Eareckson, Ill. "Interfacial Polycondensation. X. Polyphenyl Esters". Journal of Polymer Science. vol. XL. pp. 399-406 (1959).

Eareckson, Journal of Polymer Science, vol. XL, pp. 399-406 (1959).

JP04-225062. "Polycarbonate Resin Composition" (Abstract Only).

JP1201326. Human Translation of Japanese Patent.

JP56133332. Translated from Japanese by the Ralph McElroy Translation Company.

WEATHERABLE, THERMOSTABLE POLYMERS HAVING IMPROVED FLOW COMPOSITION

CROSS REFERENCE TO RELATED APPLICATIONS

This application is a continuation-in-part of U.S. application Ser. No. 11/025,635, filed Dec. 29, 2004 now U.S. Pat. No. 7,169,859, which is a continuation-in-part of application Ser. No. 10/307,873, filed Dec. 2, 2002, now U.S. Pat. No. 6,861,482, issued Mar. 1, 2005, which is a continuation-in-part of application Ser. No. 09/908,396, filed Jul. 18, 2001, now U.S. Pat. No. 6,610,409, issued Aug. 26, 2003, which is a continuation-in-part of application Ser. No. 09/368,706, filed Aug. 5, 1999, now U.S. Pat. No. 6,306,507, issued Oct. 23, 2001, which claims the benefit of U.S. Provisional Application No. 60/134,692, filed May 18, 1999, and which applications are incorporated herein by reference.

BACKGROUND OF THE INVENTION

The present invention relates to polymers that are thermostable, weatherable and have good flow characteristics and good ductility characteristics especially at lower temperatures. More particularly, the present invention relates to poly (resorcinol phthalate-polycarbonate) copolymers that include soft-block moieties. Such polymers may be advantageously used in multilayer articles as UV-protective coatings or as weatherable, thermoformable articles with good ductility.

Various polymeric articles have a problem of long-term color instability. In many cases this instability is seen as yellowing of the polymer or loss of glossiness. Yellowing of polymers is often caused by the action of ultraviolet radiation. Such yellowing is frequently designated "photoyellowing". To reduce photoyellowing, ultraviolet absorbing compounds (UVA's) may be incorporated into the polymer. For the most part, UVA's are low molecular weight compounds, which must be employed at relatively low levels, typically up to 1% by weight, to avoid degradation of the physical properties of the polymer. For example, incorporation of UVA's may lead to loss of impact strength, loss of high temperature properties as reflected in heat distortion temperature, and/or susceptibility to attack by organic liquids.

Polymers comprising polyesters containing resorcinol arylate chain members often provide good resistance to photoyellowing and loss of gloss, and thus are considered to possess good "weatherability." The arylate moieties typically contain isophthalate, terephthalate, and mixtures of isophthalate and terephthalate. Polyesters of resorcinol arylates may provide good protection against photoyellowing when coated over a resinous substrate.

The good weatherability properties of polyesters containing resorcinol arylate polyester units are believed to arise in large part from the screening effect these polymers may provide against ultraviolet (UV) light. On exposure to UV light, polymers comprising resorcinol arylate chain members can undergo a photochemically-induced Fries rearrangement that converts at least a portion of the polymer from polyester chain members to o-hydroxybenzophenone-type chain members. The o-hydroxybenzophenone-type chain members act to screen against further UV exposure and protect UV-sensitive components underlying a resorcinol arylate-containing composition.

Polyesters containing resorcinol arylate chain members may be made using melt polymerization or interfacial methods. Polyesters containing resorcinol arylate chain members may be prepared by melt methods as disclosed in U.S. Pat. No. 4,127,560 and in Japanese Kokai 1/201,326. The methods, however, do not allow the incorporation of greater than 30 mole percent terephthalate and were found to result in a polyester having unacceptable levels of color. Polyesters containing resorcinol arylate chain members have also been prepared by an interfacial method (see e.g., U.S. Pat. No. 3,460,961; and Eareckson, Journal of Polymer Science, vol. XL, pp. 399-406 (1959)).

One common problem in the preparation of resorcinol arylate-containing polyesters is the presence of destabilizing anhydride bonds, which are believed to be easily broken under thermal conditions typical of polycarbonate processing to produce shorter chains terminated by acid end groups. These acid end-groups may in turn, accelerate the hydrolysis of the arylate moiety, generating additional carboxyl and hydroxyl end-groups, and further contributing to molecular weight degradation and loss of other desirable properties. Methods for preparing thermostable resorcinol arylate-containing polyesters substantially free of anhydride bonds are described in commonly owned U.S. Pat. Nos. 6,265,522, 6,291,589, 6,294,647, and 6,306,507.

The good weatherability properties of polymers comprising resorcinol arylate chain members make them especially useful in blends and in multilayer articles in which the polymers act as a protecting layer for more sensitive substrate components. Multilayer articles containing layers made from resorcinol arylate-containing polyester have been described by Cohen et al., Journal of Polymer Science: Part A-1, vol. 9, 3263-3299 (1971) and in U.S. Pat. No. 3,460,961. However, the coatings developed using this method were thermally unstable and had to be applied by solution coating followed by evaporation of the solvent. Also, Japanese Kokai 1/199,841 discloses a method for coating bottles using a polyester of resorcinol and isophthalic acid. The method was limited, however, in only describing coating of poly(ethylene terephthalate) substrates.

Thus, polymers comprising resorcinol arylate have proven to be very useful materials for weatherable applications, and methods are available for making polymers comprising resorcinol arylate that are both weatherable and, due to the almost complete elimination of anhydride linkages, thermostable. Additionally, this family of polymers also has good solvent resistance, good scratch resistance, and excellent ductility. One limitation of this family, however, is the fact that the melt viscosity is higher than polycarbonates with comparable molecular weights. This limitation can potentially preclude some applications, such as use of the polymer for coating UV-sensitive articles. Also, for injection molding of blends with other polymers or the manufacture of multilayer films made by co-extrusion, a match of melt viscosity is preferred. In addition, manufacture of large or thin-walled parts requires low melt viscosity. Hoover and Sybert (U.S. Pat. No. 5,932,677) disclose polymers with a low melt viscosity, prepared in a one-step process by reacting together a siloxane, a bisphenol and an aromatic dicarboxylic acid halide. However, the method results in polymers that are opaque, and thus may be of limited use where a clear coating is called for.

Hoover and Sybert (U.S. Pat. No. 5,455,310) also disclose polysiloxane polycarbonate block copolymers further comprising phenolphthalein polyester blocks with improved ductility, especially at low temperatures.

What is needed then, is a way to produce transparent, thermostable, weatherable polymers comprising resorcinol arylate with good flow characteristics at the temperatures used for extrusion (sheet, film, and injection molding), and improved ductility, especially at low temperatures. To be cost effective, the method should employ components that are easily obtained and that can be incorporated into existing polymerization protocols.

BRIEF SUMMARY OF THE INVENTION

A copolymer composition comprises an arylate polyester unit, an aromatic carbonate unit, and a soft-block moiety, wherein individual occurrences of the soft block moiety are substantially linked by a spacer unit comprising one or more of the arylate polyester units, one or more of the aromatic carbonate units, or a combination comprising each of these. In one embodiment, the soft block moiety comprises a polysiloxane block. A film of the copolymer composition has a percent transmittance of greater than or equal to 60% as determined according to ASTM D1003-00.

In another aspect, a method of forming a copolymer composition comprises substantially forming the bis-haloformates of a dihydroxy compound comprising an arylate polyester unit, and a dihydroxy compound comprising a soft-block moiety, and reacting the bis-haloformates with a dihydroxy aromatic compound.

In another aspect, a copolymer composition comprises: a polysiloxane block comprising siloxane units, wherein the polysiloxane block is of the formula:

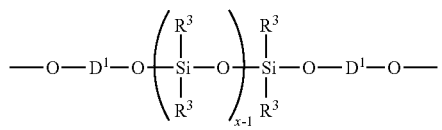

wherein x is 4 to 50, each $R^3$ is the same or different, and is $C_{1-8}$ alkyl or $C_{6-13}$ aryl; and $D^1$ is the reaction residue of a dihydroxy aromatic compound; or the polysiloxane block is of the formula:

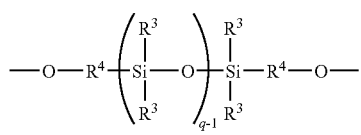

wherein q is 4 to 50; each $R^3$ is the same or different, and $R^4$ is $C_{6-30}$ hydrocarbylene; and a polyarylate-polycarbonate block consisting essentially of arylate polyester units and aromatic carbonate units present in an amount of 50 to 99 mole percent of arylate polyester units; and 1 to 50 mole percent aromatic carbonate units, wherein 1 to 30 mole percent of the aromatic carbonate units are resorcinol carbonate units, and 0 to 35 mole percent of the aromatic carbonate units are bisphenol carbonate units; wherein the sum of the mole percentages of arylate polyester units and aromatic carbonate units in the arylate block is 100 mole percent, wherein the polysiloxane blocks are connected to an arylate ester unit, a aromatic carbonate unit, or both an arylate ester unit and a aromatic carbonate unit, and wherein the siloxane units of the polysiloxane block are present in an amount of 0.2 to 10 wt % based on the weight of the copolymer composition, and wherein a molded article having a thickness of 3.2±0.12 millimeters, and consisting of the copolymer composition, has a percent transmittance of greater than or equal to 70%, according to ASTM D1003-00.

In another aspect, a thermoplastic composition comprising the copolymer composition, and articles prepared therefrom, are also disclosed.

DETAILED DESCRIPTION

The present invention may be understood more readily by reference to the following detailed description of preferred embodiments of the invention and the examples included herein. In the specification and the claims which follow, reference will be made to a number of terms which shall be defined to have the following meanings:

The singular forms "a", "an" and "the" include plural references unless the context clearly dictates otherwise.

"Optional" or "optionally" means that the subsequently described event or circumstance may or may not occur, and that the description includes instances where the event occurs and instances where it does not.

The terms "first," "second," "first part," "second part," and the like, where used herein, do not denote any order, quantity, or importance, and are used to distinguish one element from another, unless specifically stated otherwise.

As used herein the term "polycarbonate" refers to polycarbonates incorporating structural units derived from one or more dihydroxy aromatic compounds and includes copolycarbonates and polyestercarbonates.

"BPA" is herein defined as bisphenol A or 2,2-bis(4-hydroxyphenyl)propane.

"Catalytically effective amount" refers to the amount of the catalyst at which catalytic performance is exhibited.

As used herein the term "monofunctional phenol" means a phenol comprising a single reactive hydroxy group.

As used herein the term "aliphatic radical" refers to a radical having a valence of at least one comprising a linear or branched array of atoms which is not cyclic, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Thus, the array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valence of at least one comprising an array of atoms which is cyclic but which is not aromatic optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

As used herein, the term "alkyl" refers to a straight or branched chain hydrocarbon having from one to ten carbon atoms, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "alkyl" as used herein include, but are not limited to, methyl, n-butyl, n-pentyl, isobutyl, and isopropyl, and the like. As used herein, the term "lower" refers to a group having between one and six carbons.

As used herein, the term "alkylene" refers to a straight or branched chain divalent hydrocarbon radical having from one to ten carbon atoms, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "alkylene" as used herein include, but are not limited to, methylene, ethylene, and the like.

As used herein, the term "alkenyl" refers to a hydrocarbon radical having from two to ten carbons and at least one carbon-carbon double bond, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed.

As used herein, the term "alkenylene" refers to a straight or branched chain divalent hydrocarbon radical having from two to ten carbon atoms and one or more carbon-carbon double bonds, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "alkenylene" as used herein include, but are not limited to, ethene-1,2-diyl, propene-1,3-diyl, methylene-1,1-diyl, and the like.

As used herein, the term "hydrocarbyl" refers to a substituted or unsubstituted monovalent group comprising carbon and hydrogen, and may be aliphatic, aromatic, or a combination of aliphatic and aromatic. A hydrocarbyl group may also include one or more heteroatoms, such as oxygen, nitrogen, sulfur, and the like, wherein the heteroatom may be present as a substituent, e.g., a heteroatom-containing group such as halo, oxo, heterocycle, alkoxy, hydroxy, aryloxy, —NO$_2$, carboxy, acyl, amino, alkylamino, amido, and the like, as long as the substituent does not substantially interfere with manufacture or use of the compositions. The heteroatom may also be present as essential structural component of the group, for example in the form of an ester or ether linkage, as long as the heteroatom does not substantially interfere with manufacture or use of the compositions. A hydrocarbyl group may be linear, branched, or cyclic, including polycyclic, or a combination comprising one or more of these. Similarly, the term "hydrocarbylene," as used herein, refers to a divalent hydrocarbyl group. Apart from the specified valences and any limitations implied by a specified number of atoms comprising these groups, no other specific structure is implied.

As used herein, "cycloalkyl" refers to an alicyclic hydrocarbon group with one or more degrees of unsaturation, having from three to twelve carbon atoms, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, nitro, cyano, halogen, or lower perfluoroalkyl, multiple degrees of substitution being allowed. "Cycloalkyl" includes by way of example cyclopropyl, cyclobutyl, cyclopentyl, cyclohexyl, cycloheptyl, or cyclooctyl, and the like.

As used herein, the term "cycloalkylene" refers to a non-aromatic alicyclic divalent hydrocarbon radical having from three to twelve carbon atoms and optionally possessing one or more degrees of unsaturation, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by alkyl, nitro, cyano, halogen, or lower perfluoroalkyl, multiple degrees of substitution being allowed. Examples of "cycloalkylene" as used herein include, but are not limited to, cyclopropyl-1,1-diyl, cyclopropyl-1,2-diyl, cyclobutyl-1,2-diyl, cyclopentyl-1,3-diyl, cyclohexyl-1,4-diyl, cycloheptyl-1,4-diyl, or cyclooctyl-1,5-diyl, and the like.

As used herein, the term "aryl" refers to a benzene ring or to an optionally substituted benzene ring system fused to one or more optionally substituted benzene rings, optionally substituted with substituents selected from the group consisting of lower alkyl, lower alkoxy, lower alkylsulfenyl, lower alkylsulfonyl, oxo, hydroxy, mercapto, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of aryl include, but are not limited to, phenyl, 2-naphthyl, 1-naphthyl, 1-anthracenyl, and the like.

As used herein, the term "arylene" refers to a benzene ring diradical or to a benzene ring system diradical fused to one or more optionally substituted benzene rings, optionally substituted with substituents selected from the group consisting of lower alkyl, lower alkoxy, lower alkylsulfanyl, lower alkylsulfenyl, lower alkylsulfonyl, oxo, hydroxy, mercapto, amino optionally substituted by alkyl, carboxy, tetrazolyl, carbamoyl optionally substituted by alkyl, aminosulfonyl optionally substituted by alkyl, acyl, aroyl, heteroaroyl, acyloxy, aroyloxy, heteroaroyloxy, alkoxycarbonyl, silyloxy optionally substituted by alkoxy, alkyl, or aryl, silyl optionally substituted by alkoxy, alkyl, or aryl, nitro, cyano, halogen, or lower perfluoroalkyl, multiple degrees of substitution being allowed. Examples of "arylene" include, but are not limited to, benzene-1,4-diyl, naphthalene-1,8-diyl, and the like.

As used herein, the term "direct bond", where part of a structural variable specification, refers to the direct joining of the substituents flanking (preceding and succeeding) the variable taken as a "direct bond".

The present invention describes polymers that are thermostable, weatherable and have good flow characteristics. The present invention provides various methods to produce resorcinol arylate polycarbonate copolymers that include soft-block moieties. In addition to being thermostable to conditions typically required for polymer processing and providing good protection against UV degradation, such polymers have good scratch resistance, good solvent resistance, and excellent ductility. Such polymers may be used in multilayer articles as UV-protective coatings or for flow injection applications.

Thus, in one aspect, the present invention describes a resorcinol ester polycarbonate polymer having good flow characteristics comprising: (a) a resorcinol arylate polyester chain; (b) at least one organic carbonate group; and (c) at least one soft-block chemical moiety.

In an embodiment, the polymer is made using an interfacial method. In an embodiment, the resorcinol arylate polyester chain comprises the condensation of at least one resorcinol moiety with at least one dicarboxylic acid dichloride, wherein the dicarboxylic acid residues comprise a monocyclic aromatic moiety or a polycyclic aromatic moiety.

Preferably, the resorcinol arylate polyester chain is substantially free of anhydride linkages. More preferably, and to generate a chain substantially free of anhydride linkages, the resorcinol arylate polyester chain comprises the condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups on the resorcinol moiety.

In an embodiment, the resorcinol moiety used to generate the resorcinol arylate polyester chain comprises compounds of Formula I

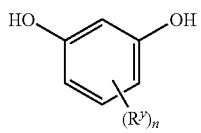

(Formula I)

wherein $R^y$ is at least one of $C_{1-12}$ alkyl or halogen, and n is 0-3.

Preferably, the resorcinol moiety used to generate the resorcinol arylate polyester chain comprises unsubstituted resorcinol, 2-methyl resorcinol, and mixtures thereof.

In an embodiment, the dicarboxylic acid residues comprise a monocyclic aromatic moiety or a polycyclic aromatic moiety. Preferably, the at least one dicarboxylic acid dichloride comprises isophthaloyl dichloride, terephthaloyl dichloride, naphthalene-2,6-dicarboxylic acid dichloride and mixtures thereof.

In an embodiment, the resorcinol ester polycarbonate polymer comprises a backbone structure as illustrated in Formula IV:

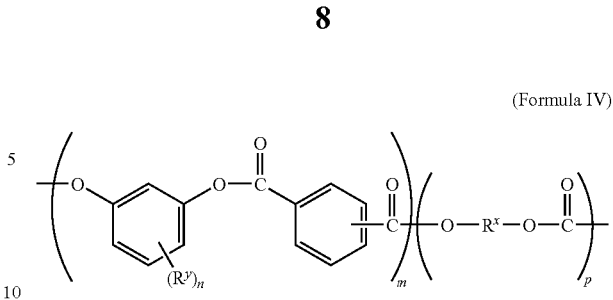

(Formula IV)

where $R^y$ is at least one of $C_{1-12}$ alkyl or halogen, n is 0-3, m is at least about 8, p is at least about 10, and $R^x$ is at least one divalent organic radical, where for the purposes of Formula IV, the organic radical comprises an aromatic, aliphatic, or cycloaliphatic radical. More specifically, an aliphatic or cycloaliphatic divalent organic radical $R^x$ may comprise $C_1$-$C_{30}$ alkyl, $C_4$-$C_{30}$ cycloalkyl, or $C_6$-$C_{30}$ aryl, $C_1$-$C_{30}$ alkoxy, $C_4$-$C_{30}$ cycloalkoxy or $C_6$-$C_{30}$ aryloxy It will be appreciated that a divalent organic radical $R^x$ may derive from its dihydroxy compound HO—$R^x$—OH. Suitable aliphatic or cycloaliphatic diols include, but are not limited to, ethylene glycol, propylene glycol, 1,3-butanediol, 1,4-butanediol, 1,5-pentanediol, 1,6-hexanediol, 1,8-octanediol, 1,9-nonanediol, 1,10-decanediol, 1,11-undecanediol, 1,12-dodecanediol, 2,2-dimethyl-1,3-propanediol, diethyleneglycol, dipropyleneglycol, polyethylene glycols, polypropylene glycols, poly-(ethylene-propylene) glycols, cyclohexane diol, 1,4-dihydroxymethyl cyclohexane, methylene-bis-cyclohexanol, isopropylidine-bis-cyclohexanol, 1,4 dihydroxydecalin, 1,5-dihydroxydecalin, 2,6-dihydroxydecalin, and the like. A combination of one or more of the foregoing may be used.

Preferably, $R^x$ comprises a divalent organic radical derived from a bisphenol of Formula VIII:

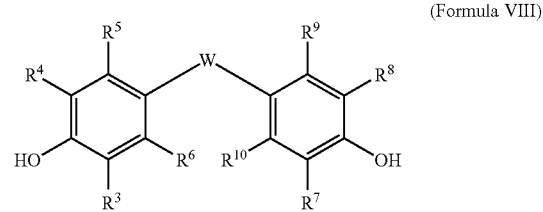

(Formula VIII)

wherein $R^3$-$R^{10}$ are independently a hydrogen atom, halogen atom, nitro group, cyano group, $C_1$-$C_{30}$ alkyl group, $C_4$-$C_{30}$ cycloalkyl group, or $C_6$-$C_{30}$ aryl group, a $C_1$-$C_{30}$ alkoxy, $C_4$-$C_{30}$ cycloalkoxy or $C_6$-$C_{30}$ aryloxy; W is a direct bond, or an oxygen atom, sulfur atom, a C=O group, a $SO_2$ group, $C_1$-$C_{20}$ aliphatic radical, $C_6$-$C_{20}$ aromatic radical, $C_6$-$C_{20}$ cycloaliphatic radical or the group,

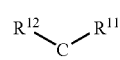

wherein $R^{11}$ and $R^{12}$ are independently a hydrogen atom, $C_1$-$C_{20}$ alkyl group, $C_4$-$C_{20}$ cycloalkyl group, or $C_4$-$C_{20}$ aryl group; or $R^1$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ arylalkyl, $C_5$-$C_{20}$ cycloalkyl groups or a combination thereof. In an embodiment, the dihydroxy aromatic compounds comprise alkyl or alkylene esters.

The term soft-block as used herein indicates that some segments of the polymers are made from non-aromatic monomer units. Such non-aromatic monomer units are generally aliphatic and are known to impart flexibility to the soft-block-containing polymers. The copolymers include those comprising structural units of Formulas IX, X, XI, XII, XIII, XIV and XVI, as described herein.

In an embodiment, the soft-block moiety comprises structural units of Formulas IX, X, or XI:

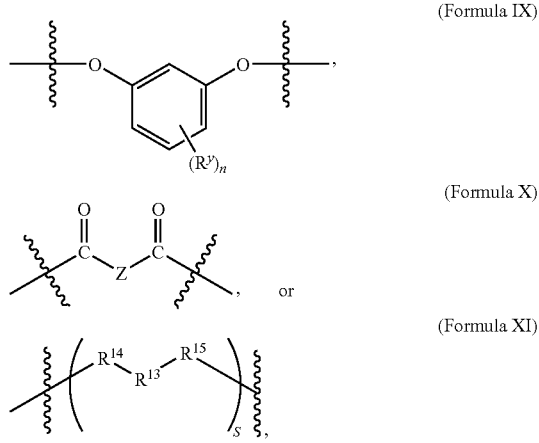

(Formula IX)

(Formula X)

(Formula XI)

wherein $R^y$ is at least one of $C_{1-12}$ alkyl or halogen, and n is 0-3; Z is a divalent aliphatic radical, or a $C_{3-20}$ straight chain alkylene such as $(CH_2)_{20}$; and s is 0-10, $R^{13}$ is a $C_{3-20}$ straight chain alkylene, a $C_{3-20}$ branched alkylene, a $C_{4-10}$ cyclo- or bicycloalkylene group, $CH_2(CH_2OCH_2)_rCH_2$, where r is 1-20, or a polyester comprising the formula $CH_2([CH_2]_bO[CH_2]b)_cCH_2$, where b is 1-3 and c is 1-10; and $R^{14}$ and $R^{15}$ each independently represent

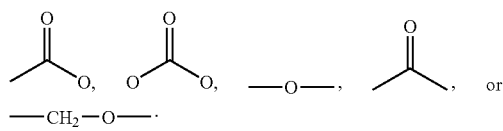

In Formulas IX, X, and XI, as elsewhere herein, wavy lines represent polymer chain structure.

In an embodiment, the soft-block moiety comprises an aliphatic ester. In an embodiment, the aliphatic ester comprises at least six carbons. More preferably, the aliphatic ester comprises at least eight carbons, and even more preferably, the aliphatic ester comprises at least ten carbons. Preferably, the aliphatic ester is introduced into the polymer by co-reaction of an aliphatic diacid or diacid chloride with an isophthaloyl or terephthaloyl chloride for polymerization with the resorcinol monomer units. More preferably, the soft-block moiety comprises carboxy-terminated polybutadiene, carboxy-terminated butadiene-acrylonitrile copolymer, adipoyl chloride, sebacoyl chloride, or dodecanoyl chloride.

In an embodiment, the soft-block moiety comprises at least one hydroxy end-group. Preferably, the hydroxy terminated soft-block moiety is substituted for a portion of the resorcinol moiety used to produce the resorcinol arylate chain.

In an embodiment, the soft-block moiety comprises oligomers of diethylene glycol, tetraethylene glycol, or low molecular weight polyethylene glycol. Preferably, the molecular weight of the polyethylene glycol is less than 600 Mw.

In another embodiment, the soft-block moiety comprises a hydroxy-terminated aliphatic polyester or polycarbonate oligomer. Preferably, the hydroxy-terminated aliphatic polyester or polycarbonate oligomer is substituted for a portion of the resorcinol to react with the dicarboxylic acid dichloride during synthesis of the polymer.

In yet another embodiment, the soft-block moiety comprises poly(tetrahydrofuran) diol or alternatively, an o,p-mixture of citronellyl citronellate diphenol (CCDP). Preferably, the poly(tetrahydrofuran) diol or CCDP reacts with the dicarboxylic acid dichloride for incorporation into the polymer.

The present invention also provides for heterofunctional soft-block moieties. Thus, in another embodiment, the soft-block moiety comprises a residue derived from a siloxane oligomer as shown in Formula XII:

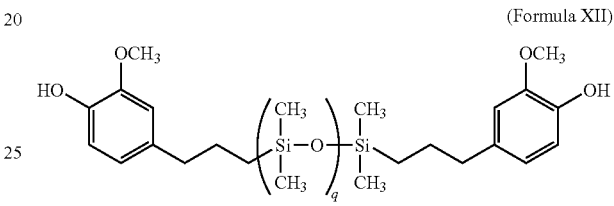

(Formula XII)

wherein q is in one embodiment 1-99, and in another embodiment 30-70, specifically 20-60. In one particular embodiment q has a value of 1-20. In another particular embodiment q has a value of 10-20.

In an embodiment, the siloxane oligomer in Formula XII may range from one to at least twenty siloxane units. Thus, the siloxane oligomer may comprise α,ω-(3-(4-hydroxy-3-methoxyphenyl)-propyl)-deca(dimethylsiloxane) (ED10E), 1,3-(bis-3-(4-hydroxy-3-methoxyphenyl)-propyl)-1,1,3,3,-tetramethyl disiloxane (EMME), or oligomers of similar structure.

In another embodiment heterofunctional soft-block moieties may comprise a residue derived from a siloxane oligomer as shown in Formula XVI:

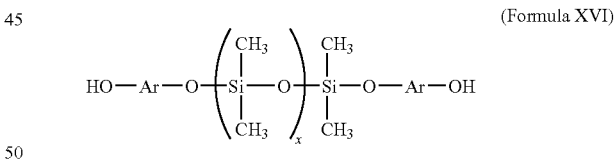

(Formula XVI)

wherein the moiety Ar is derived from a dihydroxy-substituted aromatic hydrocarbon and x has a value of about 10 to about 100. In some particular embodiments x may have a value in a range of between about 30 and about 100 and in other particular embodiments x may have a value in a range of between about 30 and about 60.

In particular embodiments Ar comprises m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1H-indan]) and similar radicals such as those derived from the dihydroxy-substituted aromatic hydrocarbons disclosed by name or formula (generic or specific) in U.S. Pat. No. 4,217,438. In other particular embodiments the dihydroxy-substituted aromatic hydrocarbon from which Ar is derived includes, but is not limited to 4,4'-(3,3,5-trimethylcyclohexylidene)diphenol; 4,4'-bis(3,5-dimethyl)

diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)sulphide, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, and mixtures thereof. In a particular embodiment the dihydroxy-substituted aromatic hydrocarbon from which Ar is derived is bisphenol A. As the siloxane oligomers shown in Formulas XII and XVI are also hydroxy terminated, they may also be substituted for a portion of the resorcinol to be introduced into the chain by reaction with the dicarboxylic acid dichloride.

In an embodiment, the soft block moiety is introduced into the polymer during synthesis of the organic carbonate group. Preferably, the soft-block moiety comprises a bisphenol functionalized with an aliphatic ester. More preferably, the bisphenol functionalized with an aliphatic ester has the structure as shown in Formula XIII:

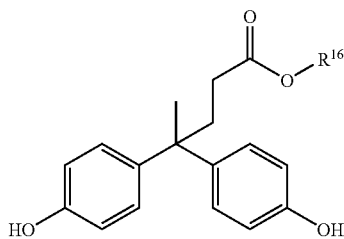

(Formula XIII)

where $R^{16}$ comprises a $C_{4-20}$ aliphatic radical. In an embodiment, the aliphatic ester comprises at least eight carbons. Preferably, the soft-block moiety comprises n-octadecyl-4,4-bis(4-hydroxyphenyl)valerate (C18-BPA-PC), 2-ethylhexyl-4,4-bis(4-hydroxyphenyl)valerate, n-hexadecyl-4,4-bis(4-hydroxyphenyl)valerate, dodecyl-4,4,-bis(4-hydroxyphenyl)valerate, and the like.

In yet another embodiment, the soft-block moiety comprises an aliphatic moiety introduced into the polymer using a chain stopper comprising an aliphatic tail as shown in Formula XIV:

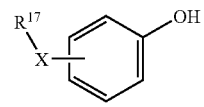

(Formula XIV)

where $R_{17}$ is a $C_6$-$C_{20}$ alkyl, and X is O or $CH_2$, such as p-nonylphenol or p-dodecylphenol.

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, as defined herein, and the soft-block comprises Formula XI, as defined herein. In an embodiment, $R^x$ of Formula IV comprises a divalent organic radical derived from a bisphenol of Formula VIII as described herein. In one embodiment, the soft-block comprises an aliphatic polyester or a polycarbonate oligomer. In another embodiment, the soft-block comprises a polyethylene oligomer. In yet another embodiment, the soft-block comprises poly(tetrahydrofuran) diol. The soft-block may also comprise an o,p-mixture of citronellyl citronellate diphenol (CCDP).

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, as defined herein, and the soft-block comprises Formula X, as defined herein. In an embodiment, $R^x$ of Formula IV comprises a divalent organic radical derived from a bisphenol of Formula VIII as described herein. In an embodiment, the soft-block comprises an aliphatic ester. Preferably, the ester comprises at least six, and more preferably at least eight, and even more preferably, at least ten carbon atoms.

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV as defined herein, and the soft-block comprises either a siloxane oligomer derived from the dihydroxy compound as shown in Formula XII, where q is in one embodiment 1-99, in another embodiment 30-70, in yet another embodiment, 1-20, and in another particular embodiment, 10-20, (Formula XII)

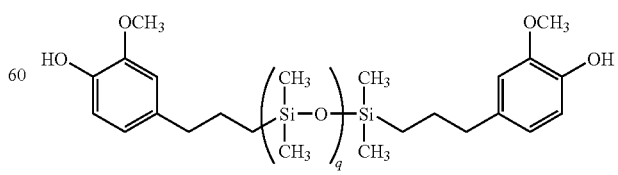

or a siloxane oligomer derived from the dihydroxy compound as shown in Formula XVI, wherein the moiety Ar is derived from a dihydroxy-substituted aromatic hydrocarbon and x has a value of about 10 to about 100:

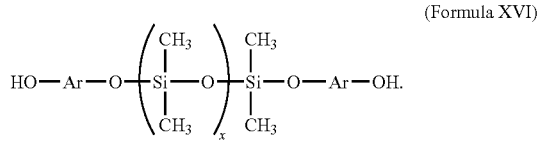
(Formula XVI)

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, as defined herein, and the soft-block comprises a bisphenol functionalized with an aliphatic ester as shown in Formula XIII:

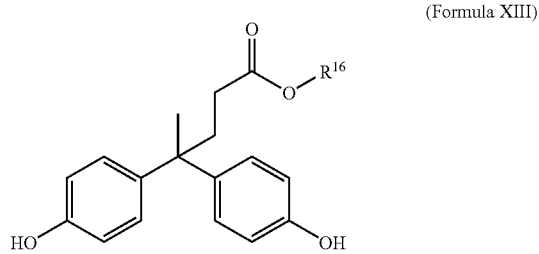
(Formula XIII)

where $R^{16}$ comprises a $C_{4-20}$ aliphatic radical. In an embodiment, $R^x$ of Formula IV comprises a divalent organic radical derived from a bisphenol of Formula VIII as described herein.

In another aspect, the present invention comprises a resorcinol ester polycarbonate polymer comprising at least one soft-block moiety incorporated into a resorcinol phthalate-co-bisphenol A-polycarbonate copolymer substantially free of anhydride linkages, wherein the resorcinol phthalate-co-bisphenol A-polycarbonate copolymer comprises the structural unit of Formula IV, and the soft-block comprises an aliphatic moiety introduced into the polymer using a chain stopper comprising an aliphatic tail as shown in Formula XIV,

(Formula XIV)

wherein $R^{17}$ comprises a $C_6$-$C_{20}$ alkyl and X is —O— or —$CH_2$—. For example, in an embodiment, the soft-block moiety comprises p-nonylphenol or p-dodecylphenol. In an embodiment, $R^x$ of Formula IV comprises a divalent organic radical derived from a bisphenol of Formula VIII as described herein.

The polymer may comprise varying levels of the soft-block moiety depending upon the characteristics that are required. Preferably, the soft-block moiety comprises 0.1-25% by weight of the polymer. More preferably, the soft-block moiety comprises 1-20% by weight of the polymer. Even more preferably, the soft-block moiety comprises 2-10% by weight of the polymer.

One of the advantages of incorporating soft-block moieties is the resultant decrease in melt viscosity that occurs upon incorporation of the soft-block. In an embodiment, the reduction in melt viscosity upon addition of the soft-block moiety comprises greater than 5% at 250° C., more preferably, greater that 10% at 250° C., and more preferably, greater than 20% at 250° C.

Preferably, the reduction in melt viscosity is associated with minimal reduction in glass transition temperature. Thus, the polymers of the present invention preferably comprise a glass transition temperature (Tg) greater than about 120° C., and more preferably, greater than 125° C., and even more preferably, greater than 130° C.

Thus, in one embodiment, the present invention comprises a thermostable, weatherable, resorcinol ester polycarbonate polymer having good flow characteristics wherein said polymer comprises: (a) a resorcinol arylate polyester chain substantially free of anhydride linkages; (b) at least one organic carbonate group; and (c) at least one soft-block chemical moiety. For example, copolyesters comprising resorcinol iso- and terephthalate polyester chain members in combination with diacid or diol alkylene chain members (so-called "soft-block" chain members) are disclosed in commonly owned U.S. Pat. No. 5,916,997. These copolymers have excellent weatherability and flexibility. Copolyestercarbonates comprising resorcinol iso- and terephthalate polyester chain members in combination with carbonate chain members are disclosed in commonly owned, co-pending application Ser. No. 09/416,529, filed Oct. 12, 1999. These copolymers also have excellent weatherability and are compatible with polycarbonates in blends. Poly(resorcinol isophthalate) containing a soft-block comprised of sebacic acid functionalities have also been disclosed in U.S. Pat. No. 6,143,839. Still, there has not been a previous description of poly(resorcinol phthalate-co-polycarbonate) ("poly(RP-co-PC)") materials containing soft-block moieties.

In an embodiment, the polymers of the invention have good thermal stability. Thermal stability within the context of the present invention refers to resistance of a polymer to molecular weight degradation under thermal conditions. Thus, a polymer with poor thermal stability shows significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions as the melt viscosity changes.

In one of its aspects, the method of the present invention provides thermally stable polymers comprising arylate polyester chain members. These chain members comprise at least one diphenol residue in combination with at least one aromatic dicarboxylic acid residue. In one embodiment, the diphenol residue of the arylate polyester chain member is derived from a 1,3-dihydroxybenzene moiety, as illustrated in Formula I:

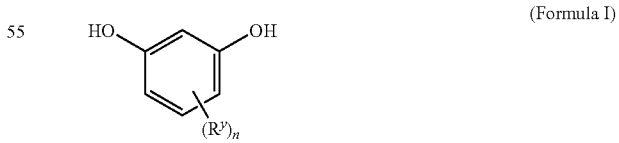
(Formula I)

commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

In Formula I, $R^y$ is at least one of $C_{1-12}$ alkyl or halogen, and n is 0-3. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, iso-propyl, butyl, iso-butyl, t-butyl, hexyl, cyclohexyl, nonyl, decyl, and aryl-substituted alkyl, including benzyl. In a particular embodiment, an alkyl group is methyl. Suitable halogen groups are bromo, chloro, and fluoro. The value for n in various embodiments may be 0-3, in some embodiments 0-2, and in still other embodiments 0-1. In one embodiment, a resorcinol moiety is 2-methylresorcinol. In another embodiment the resorcinol moiety is an unsubstituted resorcinol moiety in which n is zero.

Suitable dicarboxylic acid residues include aromatic dicarboxylic acid residues derived from monocyclic moieties. In various embodiments suitable dicarboxylic acid residues include those derived from isophthalic acid, terephthalic acid, or mixtures of isophthalic and terephthalic acids. Suitable dicarboxylic acid residues also include those derived from polycyclic moieties, illustrative examples of which include diphenyl dicarboxylic acid, diphenylether dicarboxylic acid, and naphthalenedicarboxylic acid, especially naphthalene-2,6-dicarboxylic acid. In some embodiments, the aromatic dicarboxylic acid residues are derived from mixtures of isophthalic and/or terephthalic acids as typically illustrated in Formula II:

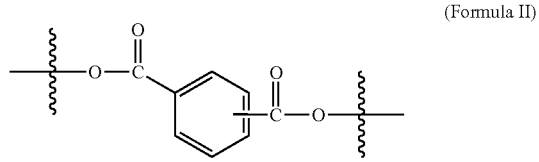

(Formula II)

Therefore, in one embodiment, the present invention provides thermally stable polymers comprising resorcinol arylate polyester chain members as typically illustrated in Formula III:

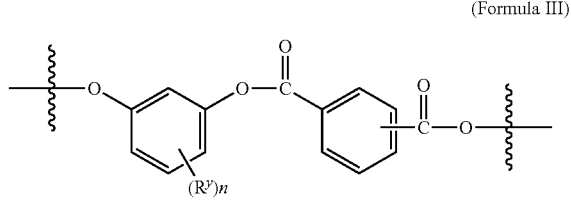

(Formula III)

wherein $R^y$ and n are as previously defined.

The copolyester polycarbonates of the present invention include those comprising arylate and organic carbonate blocks as illustrated in Formula IV,

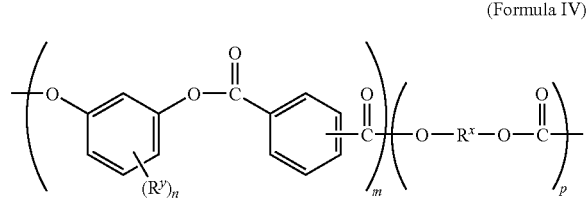

(Formula IV)

where as above, $R^y$ is at least one of $C_{1-12}$ alkyl or halogen, n is 0-3, m is at least about 8, p is at least about 10, and $R^x$ is at least one divalent organic radical, wherein the organic radical comprises an aromatic, aliphatic or a cycloaliphatic radical.

The arylate blocks have a degree of polymerization (DP), represented by m, in one embodiment of at least about 4, in another embodiment of at least about 10, in another embodiment of at least about 20, and in still another embodiment of about 30-150. The DP of the organic carbonate blocks, represented by p, is in one embodiment generally at least about 10, in another embodiment at least about 20 and in still another embodiment about 50-200. The distribution of the blocks may be such as to provide a copolymer having any desired weight proportion of arylate blocks in relation to carbonate blocks. In general, the content of arylate blocks is in one embodiment about 10-95% by weight and in another embodiment about 50-95% by weight.

In the organic carbonate blocks, each $R^x$ is independently a divalent organic radical. In various embodiments said radical comprises at least one dihydroxy-substituted aromatic hydrocarbon, and at least about 60 mole percent of the total number of $R^x$ groups in the polymer are aromatic organic radicals and the balance thereof are aliphatic, alicyclic, or aromatic radicals. In some embodiments suitable $R^x$ radicals comprise those described hereinabove for Ar groups of Formula XVI and include, but are not limited to, m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438.

In some embodiments each $R^x$ is an aromatic organic radical and in other embodiments a radical of Formula V:

$-A^1-Y-A^2-$ (Formula V)

wherein each $A^1$ and $A^2$ is a monocyclic divalent aryl radical and Y is a bridging radical in which one or two carbon atoms separate $A^1$ and $A^2$. The free valence bonds in Formula V are usually in the meta or para positions of $A^1$ and $A^2$ in relation to Y. Compounds in which $R^x$ has Formula V are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula V, $A^1$ and $A^2$ typically represent unsubstituted phenylene or substituted derivatives thereof, illustrative substituents (one or more) being alkyl, alkenyl, and halogen (particularly bromine). In one embodiment, unsubstituted phenylene radicals are preferred. Both $A^1$ and $A^2$ are often p-phenylene, although both may be o- or m-phenylene or one o- or m-phenylene and the other p-phenylene.

The bridging radical, Y, is one in which one or two atoms separate $A^1$ from $A^2$. In a particular embodiment, one atom separates $A^1$ from $A^2$. Illustrative radicals of this type are —O—, —S—, —SO— or —SO$_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals.

In some embodiments, gem-alkylene (commonly known as "alkylidene") radicals are preferred. Also included, however, are unsaturated radicals. In some embodiments, an exemplary bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^x$ in the carbonate blocks may at least partially comprise resorcinol moiety. In other words, in some embodiments of the invention, carbonate blocks of Formula IV may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of:

(a) an ester linkage between a suitable dicarboxylic acid residue of an arylate moiety and an —O—$R^x$—O— moiety of an organic carbonate moiety, for example as typically illustrated in Formula VI, wherein $R^x$ is as previously defined:

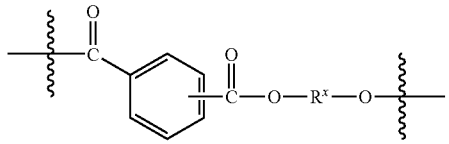

(Formula VI)

and (b) a carbonate linkage between a diphenol residue of a resorcinol arylate moiety and a —(C=O)—O— moiety of an organic carbonate moiety as shown in Formula VII:

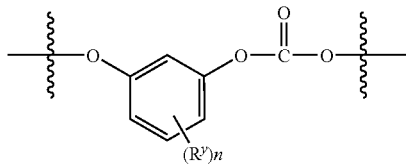

(Formula VII)

wherein $R^y$ and n are as previously defined.

In a specific embodiment, bisphenol is used to generate the polycarbonate wherein the bisphenol group bisphenols have Formula VIII:

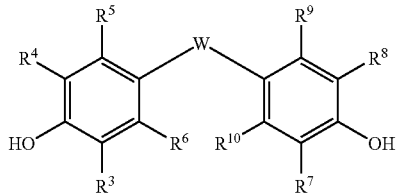

(Formula VIII)

wherein $R^3$-$R^{10}$ are independently a hydrogen atom, halogen atom, nitro group, cyano group, $C_1$-$C_{30}$ alkyl group, $C_4$-$C_{30}$ cycloalkyl group, or $C_6$-$C_{30}$ aryl group, a $C_1$-$C_{30}$ alkoxy, $C_4$-$C_{30}$ cycloalkoxy or $C_6$-$C_{30}$ aryloxy; W is a direct bond, or an oxygen atom, sulfur atom, C=O group, $SO_2$ group, $C_1$-$C_{20}$ aliphatic radical, $C_6$-$C_{20}$ aromatic radical, $C_6$-$C_{20}$ cycloaliphatic radical, or the group,

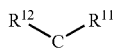

wherein $R^{11}$ and $R^{12}$ are independently a hydrogen atom, $C_1$-$C_{20}$ alkyl group, $C_4$-$C_{20}$ cycloalkyl group, or $C_4$-$C_{20}$ aryl group; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ arylalkyl, $C_5$-$C_{20}$ cycloalkyl groups or a combination thereof.

As described herein, in a specific embodiment, the carbonate blocks comprise a bisphenol. Suitable bisphenols VIII are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-diisopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3 trimethylcyclohexane; 1,1-bis(3-bromo-5-phenyl-4-hydroxyphenyl)-3,3,5-trimethylcyclohexane; 1,1-bis(3,5-diisopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-trimethylcyclohexane; 1,1-bis(3-bromo-5-phenyl-4-hydroxyphenyl)-3,3,5-trimethylcyclohexane; 1,1-bis(3,5-diisopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene. Bisphenol A is preferred.

Poly(resorcinol arylate-polycarbonate) copolymers possess many desirable properties such as, but not limited to, weatherability, flexibility, thermostability, and resistance to physical and chemical degradation. The present invention relies on the use of soft-block functionalities to provide reduced melt viscosity and improved flow characteristics to poly(resorcinol arylate-polycarbonate) polymers. Thus, the present invention teaches the incorporation of soft block functionalities into poly(resorcinol arylate-polycarbonate) polymers.

The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units as described by Formulas IX, X, XI, XII, XIII, XIV, and XVI. It is contemplated, however, that other similar or equivalent structures may be included in the polymer chain to increase the aliphatic nature (and flexibility) of the final product. For example, oligomers comprising functional groups other than oxygen and siloxane may be employed. Also, the present invention contemplates that more that one type of soft-block polymer may be used. For example, it is contemplated that poly(resorcinol arylate-polycarbonate) polymers may be made using at least a portion of the chain stoppers comprising an aliphatic tail along with at least a portion of bisphenol substituted with an aliphatic ester and/or an aliphatic ester substituted for a portion of the dicarboxylic acid dichloride used to produce the chain.

In another aspect, the present invention comprises a method of making a resorcinol ester polycarbonate polymer having good flow characteristics comprising: (a) generating a resorcinol arylate polyester; (b) conducting an interfacial polymerization in the presence of at least one divalent organic radical to generate a poly(resorcinol arylate-co-polycarbonate) comprising an organic carbonate group; and (c) incorporating at least one soft-block chemical moiety into the polymer during step (a) or step (b) or both.

In an embodiment, the resorcinol arylate polyester chain comprises the condensation of at least one resorcinol moiety with at least one dicarboxylic acid dichloride, wherein the dicarboxylic acid residues comprise monocyclic moieties or polycyclic aromatic moieties.

Preferably, the resorcinol arylate polyester chain is substantially free of anhydride linkages. More preferably, and to generate an arylate polyester chain is substantially free of anhydride linkages, the resorcinol arylate polyester chain comprises the interfacial condensation of at least one resorcinol moiety with at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups. Even more preferably, the stoichiometric ratio of total phenolic groups to total acid chloride groups for generation of the resorcinol arylate polyester chain is 1.5-1.01:1.

In an embodiment, the resorcinol moiety used to generate the resorcinol arylate polyester chain comprises compounds of Formula I:

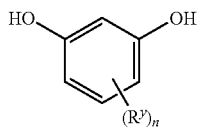

(Formula I)

wherein $R^y$ is at least one of $C_{1-12}$ alkyl or halogen, and n is 0-3. Preferably, the resorcinol moiety used to generate the resorcinol arylate polyester chain comprises unsubstituted resorcinol, 2-methyl resorcinol, and mixtures thereof.

In an embodiment, the dicarboxylic acid residues comprise monocyclic or polycyclic aromatic groups. Preferably, the dicarboxylic acid dichloride comprises isophthaloyl dichloride, terephthaloyl dichloride, naphthalene-2,6-dicarboxylic acid dichloride and mixtures thereof.

In an embodiment, the resorcinol ester polycarbonate polymer comprises structure as illustrated in Formula IV:

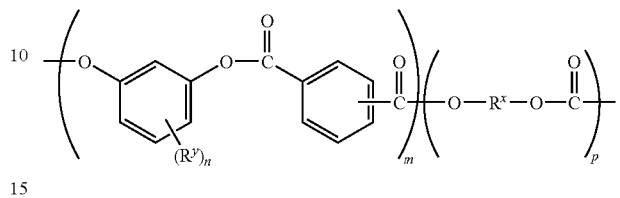

(Formula IV)

where $R^y$ is at least one of $C_{1-12}$ alkyl or halogen, n is 0-3, m is at least about 8, p is at least about 10, and $R^x$ is at least one divalent organic radical, wherein the organic radical comprises an aromatic, aliphatic or cycloaliphatic radical.

Preferably, $R^x$ comprises a divalent organic radical derived from a bisphenol of Formula VIII:

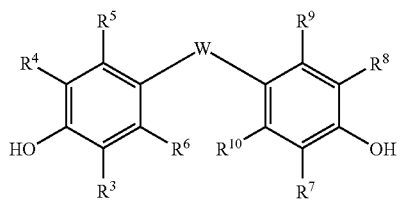

(Formula VIII)

wherein $R^3$-$R^{10}$ are independently a hydrogen atom, halogen atom, nitro group, cyano group, $C_1$-$C_{30}$ alkyl group, $C_4$-$C_{30}$ cycloalkyl group, or $C_6$-$C_{30}$ aryl group, a $C_1$-$C_{30}$ alkoxy, $C_4$-$C_{30}$ cycloalkoxy or $C_6$-$C_{30}$ aryloxy; W is a direct bond, or an oxygen atom, sulfur atom, C=O group, $SO_2$ group, $C_1$-$C_{20}$ aliphatic radical, $C_6$-$C_{20}$ aromatic radical, $C_6$-$C_{20}$ cycloaliphatic radical, or the group,

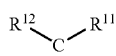

wherein $R^{11}$ and $R^{12}$ are independently a hydrogen atom, $C_1$-$C_{20}$ alkyl group, $C_4$-$C_{20}$ cycloalkyl group, or $C_4$-$C_{20}$ aryl group; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ aralkyl, $C_5$-$C_{20}$ cycloalkyl groups, or a combination thereof.

In an embodiment, the soft-block moiety comprises structural units of Formulas IX, X or XI:

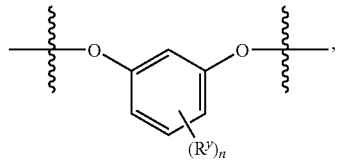

(Formula IX)

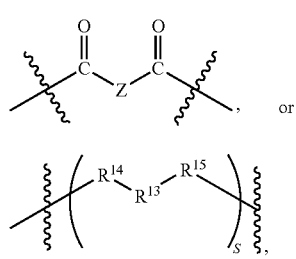
(Formula X)

or (Formula XI)

wherein $R^y$ is at least one of $C_{1-12}$ alkyl or halogen, and n is 0-3; Z is a divalent aliphatic radical, or a $C_{3-20}$ straight chain alkylene such as —$(CH_2)_{20}$—; and s is 0-10, $R^{13}$ is a $C_{3-20}$ straight chain alkylene, a $C_{3-10}$ branched alkylene, a $C_{4-10}$ cyclo- or bicycloalkylene group, —$CH_2(CH_2OCH_2)_rCH_2$—, where r is 1-20, or a polyester comprising the formula —$CH_2$ ($[CH_2]_bO[CH_2]b)_cCH_2$— where b is 1-3 and c is 1-10; and $R^{14}$ and $R^{15}$ each independently represent:

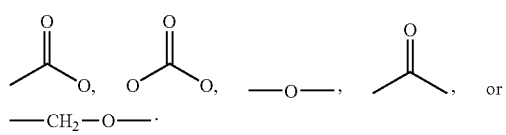

In Formulas IX, X and XI, as elsewhere herein, wavy lines represent polymer chain structure.

In an embodiment, the soft-block moiety comprises an aliphatic ester. In an embodiment, the aliphatic ester comprises at least six carbons. More preferably, the aliphatic ester comprises at least eight carbons, and even more preferably, the aliphatic ester comprises at least ten carbons. Preferably, the aliphatic ester is introduced into the polymer by co-reaction of an aliphatic diacid or diacid chloride with an isophthaloyl or terephthaloyl chloride for polymerization with the resorcinol monomer units. More preferably, the soft-block moiety comprises carboxy-terminated polybutadiene, carboxy-terminated butadiene-acrylonitrile copolymer, adipoyl chloride, sebacoyl chloride, or dodecanoyl chloride.

In an embodiment, the soft-block moiety comprises at least one hydroxy end-group. Preferably, the hydroxy terminated soft-block moiety is substituted for a portion of the resorcinol moiety used to produce the resorcinol arylate chain.

In an embodiment, the soft-block moiety comprises oligomers of diethylene glycol, tetraethylene glycol, or low molecular weight polyethylene glycol substituted for a portion of the resorcinol used to generate the chain to react with the dicarboxylic acid dichloride during synthesis of the polymer. Preferably, the molecular weight of the polyethylene glycol is less than 600 Mw.

In another embodiment, the soft-block moiety comprises a hydroxy-terminated aliphatic polyester or polycarbonate oligomer, wherein the hydroxy-terminated aliphatic polyester or polycarbonate oligomer is substituted for a portion of the resorcinol used to generate the chain to react with the dicarboxylic acid dichloride during synthesis of the polymer.

In yet another embodiment, the soft-block moiety comprises poly(tetrahydrofuran) diol or alternatively, an o,p-mixture of citronellyl citronellate diphenol (CCDP). Preferably, the poly(tetrahydrofuran) diol or CCDP also reacts with the dicarboxylic acid dichloride for incorporation into the polymer.

The present invention also provides for various heterofunctional soft-block moieties. Thus, in another embodiment, the soft-block moiety comprises the reaction residue of a siloxane oligomer as shown in Formula XII:

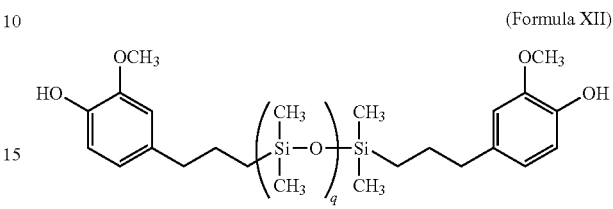
(Formula XII)

where q is in one embodiment 1-99, and in another embodiment 30-70, specifically 20-60. In one particular embodiment q has a value of 1-20. In another particular embodiment q has a value of 10-20.

In an embodiment, the siloxane oligomer may range from one to at least twenty siloxane units. Thus, the siloxane oligomer may comprise α,ω-(3-(4-hydroxy-3-methoxyphenyl)-propyl)-deca(dimethylsiloxane) (ED10E), 1,3(bis-3-(4-hydroxy-3-methoxyphenyl)-propyl)-1,1,3,3,-tetramethyl disiloxane (EMME), or oligomers of similar structure.

In still another embodiment the soft-block moiety comprises a siloxane oligomer derived from a residue of a dihydroxy compound as shown in Formula XVI, wherein the moiety Ar is derived from a dihydroxy-substituted aromatic hydrocarbon and x has a value of about 10 to about 100:

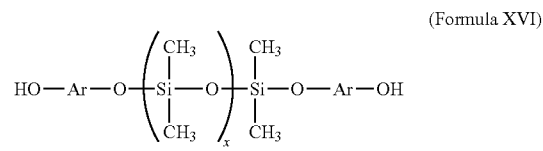
(Formula XVI)

As the siloxane oligomers shown in Formulas XII and XVI are also hydroxy terminated, they may also be substituted for a portion of the resorcinol to be introduced into the chain by reaction with the dicarboxylic acid dichloride.

In an embodiment, the soft block moiety is introduced into the polymer during syntheses of the organic carbonate group. Preferably, the soft-block moiety comprises a bisphenol functionalized with an aliphatic ester. More preferably, the bisphenol functionalized with an aliphatic ester has the structure as shown in Formula XIII,

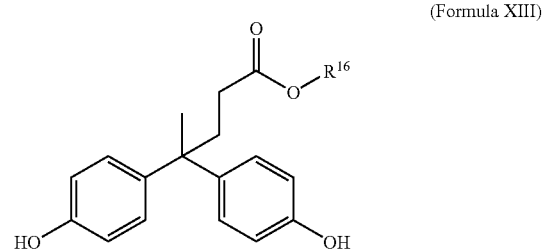
(Formula XIII)

where $R^{16}$ comprises a $C_{4-20}$ aliphatic radical. In an embodiment, the aliphatic ester comprises at least eight carbons. Preferably, the soft-block moiety comprises n-octadecyl-4,4-bis(4-hydroxyphenyl)valerate (C18-BPA-PC), 2-ethylhexyl-4,4-bis(4-hydroxyphenyl)valerate, n-hexadecyl-4,4-bis(4-hydroxyphenyl)valerate, dodecyl-4,4,-bis(4-hydroxyphenyl) valerate, and the like.

In yet another embodiment, the soft-block moiety comprises an aliphatic moiety introduced into the polymer using a chain stopper comprising an aliphatic tail as shown in Formula XIV,

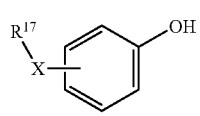

(Formula XIV)

where $R_{17}$ is a $C_6$-$C_{20}$ alkyl and X is —O— or —CH$_2$—, such as p-nonylphenol or p-dodecylphenol.

The polymer may comprise varying levels of the soft-block moiety depending upon the characteristics that are required. Preferably, the soft-block moiety comprises 0.1-25% of the polymer. More preferably, the soft-block moiety comprises 0.75-20% of the polymer. Even more preferably, the soft-block moiety comprises 1-10% of the polymer.

One of the advantages of incorporating soft-block moieties is the resultant decrease in melt viscosity that occurs upon incorporation of the soft-block. In an embodiment, the reduction in melt viscosity upon addition of the soft-block moiety comprises greater than 5% at 250° C., more preferably, greater that 10% at 250° C., and more preferably, greater than 20% at 250° C.

Preferably, the reduction in melt viscosity is preferably associated with minimal reduction in glass transition temperature. Preferably, the polymers of the present invention comprise a glass transition temperature (Tg) greater than about 120° C., and more preferably, greater than 125° C., and even more preferably, greater than 130° C.

Thus, the present invention provides methods of making resorcinol ester polycarbonate polymers that incorporate soft-block moieties and thus have good flow characteristics.

For example, in an embodiment, resorcinol phthalate-co-polycarbonate (RP-co-PC) copolymers are made via a two-step, one-pot process (e.g. Equation (1)). In a first step (a), resorcinol and chain stopper are reacted with a mixture of dicarboxylic dichlorides in CH$_2$Cl$_2$ using Et$_3$N as a catalyst with NaOH to control the pH, forming a low-molecular weight resorcinol phthalate polymer to give a compound of Formula III:

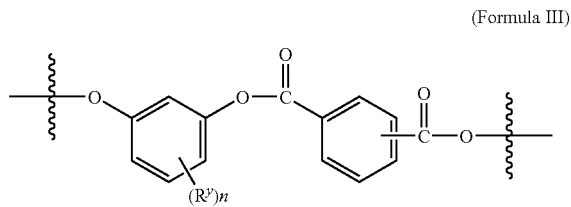

(Formula III)

In a second step (b), a dihydroxy compound, for example a bisphenol, is then added to the resorcinol arylate polyester, and the mixture subjected to phosgenation under typical polycarbonate conditions, to form an RP-co-PC copolymer compound. The soft-block moiety can be included in the polymer (during steps (a) or (b) or both, using various strategies as described herein.

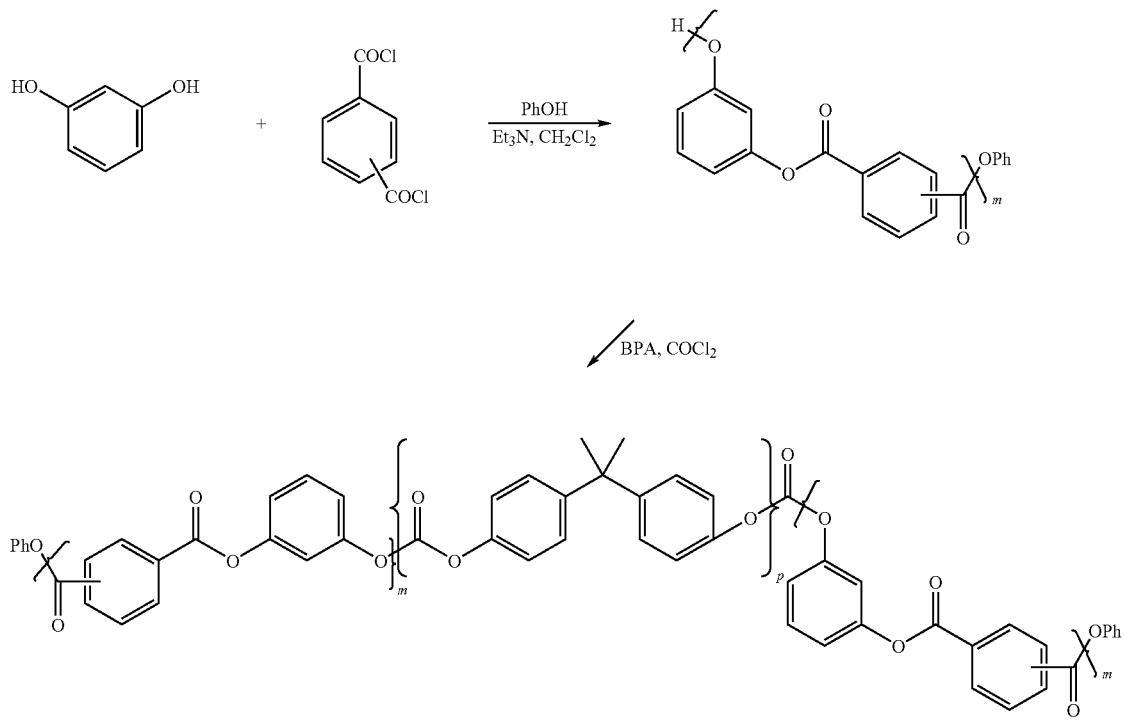

Thus, in one aspect, the present invention describes a method to make poly(resorcinol arylate polycarbonate) copolymers comprising soft-block moieties. In another embodiment, the method may comprise a two-step, two pot process, wherein the products of each of steps a and b are isolated.

Preferably, the arylate polyester chain polymer members comprise at least one diphenol residue in combination with at least one aromatic dicarboxylic acid residue. The diphenol residue may be derived from a 1,3-dihydroxybenzene moiety, as illustrated in Formula I:

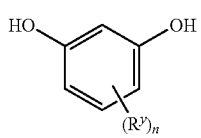

(Formula I)

wherein $R^y$ is at least one of $C_{1-12}$ alkyl or halogen, and n is 0-3. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, iso-propyl, butyl, iso-butyl, t-butyl, hexyl, cyclohexyl, nonyl, decyl, and aryl-substituted alkyl, including benzyl. In a particular embodiment, an alkyl group is methyl. Suitable halogen groups are bromo, chloro, and fluoro. The value for n in various embodiments may be 0-3, in some embodiments 0-2, and in still other embodiments 0-1. In one embodiment a resorcinol moiety is 2-methylresorcinol. In another embodiment the resorcinol moiety is an unsubstituted resorcinol moiety in which n is zero.

Suitable dicarboxylic acid dichlorides may comprise aromatic dicarboxylic acid dichlorides derived from monocyclic moieties, illustrative examples of which include isophthaloyl dichloride, terephthaloyl dichloride, or mixtures of isophthaloyl and terephthaloyl dichlorides. Suitable dicarboxylic acid dichlorides may also comprise aromatic dicarboxylic acid dichlorides derived from polycyclic moieties, illustrative examples of which include diphenyl dicarboxylic acid dichloride, diphenylether dicarboxylic acid dichloride, and naphthalenedicarboxylic acid dichloride, especially naphthalene-2,6-dicarboxylic acid dichloride, or from mixtures of monocyclic and polycyclic aromatic dicarboxylic acid dichlorides. In one embodiment the dicarboxylic acid dichloride comprises mixtures of isophthaloyl and/or terephthaloyl dichlorides as typically illustrated in Formula XV:

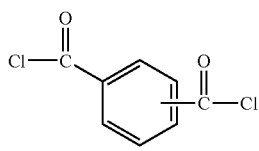

(Formula XV)

Either or both of isophthaloyl and terephthaloyl dichlorides may be present. In some embodiments the dicarboxylic acid dichlorides comprise mixtures of isophthaloyl and terephthaloyl dichloride in a molar ratio of isophthaloyl to terephthaloyl of about 0.25-4.0:1; in other embodiments the molar ratio is about 0.4-2.5:1; and in still other embodiments the molar ratio is about 0.67-1.5:1.

The resorcinol phthalate-co-polycarbonate copolymers of the present invention are illustrated in Formula IV,

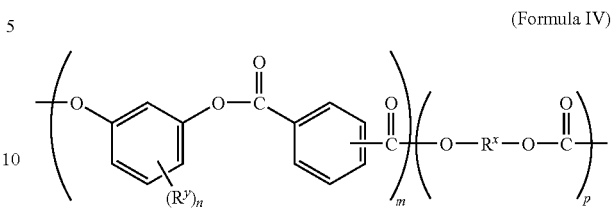

(Formula IV)

where as above, $R^y$ is at least one of $C_{1-12}$ alkyl or halogen, n is 0-3, m is at least about 8, p is at least 4, and $R^x$ is at least one divalent organic radical as described above. In an embodiment, m is 4.

The present invention relies on the use of soft-block functionalities to provide reduced melt viscosity and improved flow characteristics to RP-co-PC polymers. Thus, the present invention teaches the incorporation of melt block functionalities into RP-co-PC polymers. The melt block functionalities include those comprising structural units as described by Formulas IX, X, XI, XII, XIII, XIV and XVI. However, other similar or equivalent structures may be included in the polymer chain to increase the aliphatic nature (and flexibility) of the final product. For example, oligomers comprising heteroatoms other than oxygen and/or siloxane may be employed. Also, the present invention contemplates that more than one type of soft-block polymer may be used. For example, it is contemplated that polymers may incorporate chain stoppers having an aliphatic tail along with at least a portion of the bisphenol modified with an aliphatic ester group. Alternatively, or additionally, polyethylene glycol may be substituted for a portion of the resorcinol and an aliphatic ester substituted for a portion of the dicarboxylic acid dichloride used for the polymerization using the methods described below.

The present invention comprises various methods by which the soft-block moiety may be incorporated into a resorcinol phthalate-co-polycarbonate (RP-co-PC) polymer. In an embodiment, the method uses a chain stopper with a lengthy aliphatic tail. This technique is both simple to implement and effective. For example, p-nonylphenol or p-dodecylphenol may substituted for a normal chain stopper such as phenol in a normal RP-co-PC polymerization reaction (Equation 1). In an embodiment, incorporation of the soft-block moiety results in a large decrease in melt viscosity and flow energy with only a modest reduction in glass transition temperature (Tg).

In another embodiment, diols such as polyethylene glycol oligomers may be used as soft-block moieties. In an embodiment, a hydroxy-terminated oligomer is pre-reacted with the iso/terephthaloyl chloride in $CH_2Cl_2$ using stoichiometric triethylamine, forming a polyethylene glycol oligomer terminated with an iso/terephthaloyl chloride end group as shown in Equation 2, below. In an embodiment, the number of ethylene glycol units (r) ranges from 2-10. Resorcinol is then be added, and the remainder of the RP-co-PC polymerization carried out under usual interfacial polymerization conditions. In an embodiment, the molded polymers are clear and nearly colorless. Lower molecular weight (Mw) oligomers are very effective at reducing melt viscosity, flow energy, and Tg. Lower molecular weight polyethylene glycols such as diethylene glycol (DEG), tetraethylene glycol (TEG), and PEG 300, may be preferable since the higher molecular weight polyethylene glycols can result in the formation of very high molecular weight species.

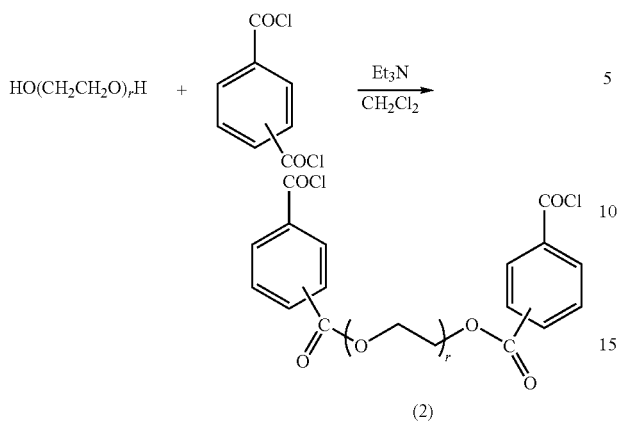

(2)

Other diols may be used. In an embodiment, the diol used as a soft-block moiety is an o,p mixture of citronellyl citronellate diphenol (Table 1, sample 20).

In yet another embodiment, poly(tetrahydrofuran)diol (poly-THF diol) reduces viscosity as well as Tg, even at a level of only 2% by weight.

The present invention also provides for heterofunctional soft-block moieties. Thus, in another embodiment, the soft-block moiety comprises a siloxane oligomer. The siloxane oligomer may range from one to at least ten siloxane units. Thus, the siloxane oligomer may comprise α,ω-(3-(4-hydroxy-3-methoxyphenyl)-propyl)-deca(dimethylsiloxane) (ED10E), 1,3-(bis-3-(4-hydroxy-3-methoxyphenyl)-propyl)-1,1,3,3,-tetramethyl disiloxane (EMME), or oligomers of similar structure. As these are also hydroxy terminated, they may also be introduced into the chain by reaction with the dicarboxylic acid dichloride. Examples of siloxane oligomers used in the invention comprise Formula XII:

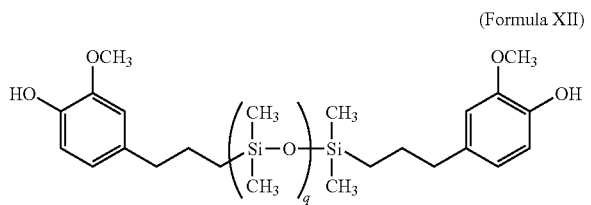

(Formula XII)

wherein q is in one embodiment 1-99, and in another embodiment 30-70. In one particular embodiment q has a value of 1-20. In another particular embodiment q has a value of 10-20.

Examples of siloxane oligomers used in the invention also comprise Formula XVI, wherein the moiety Ar is derived from a dihydroxy-substituted aromatic hydrocarbon and x has a value of about 10 to about 100:

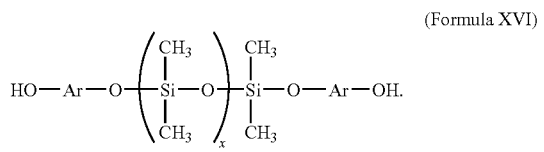

(Formula XVI)

In another embodiment, bisphenol-A functionalized with a long chain ester may be incorporated into the RP-co-PC by replacing part of the BPA normally used with ester-bisphenol.

In an embodiment, the ester bisphenol comprises compounds such as the compounds of Formula XIII:

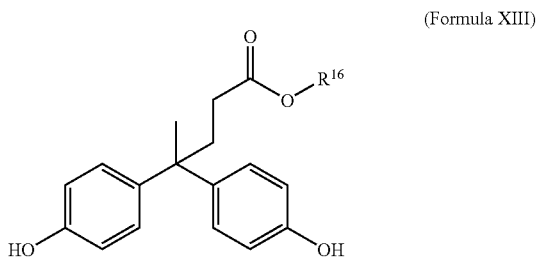

(Formula XIII)

where $R^{16}$ is alkyl chain comprising 4 to at least 20 carbons. In an embodiment, incorporation of ester-bisphenol may reduce Tg, as well as increasing flow and reducing flow energy. In some cases, however, the resultant polymer may be yellow after processing. Purification of the ester diphenol may alleviate the color problem.

In yet another embodiment, soft-block esters are introduced into an RP-co-PC copolymer as esters by co-reaction of aliphatic diacid chlorides along with the iso/terephthaloyl chloride. In an embodiment, incorporation of these long-chain aliphatic groups results in a dramatic drop in viscosity and Tg.

The method further comprises combining at least one catalyst with the interfacial reaction mixture. The catalyst may be present in various embodiments at a total level of 0.1 to 10 mol %, and in some embodiments at a total level of 0.2 to 6 mol % based on total molar amount of acid chloride groups. Suitable catalysts for the interfacial reaction comprise tertiary amines, quaternary ammonium salts, quaternary phosphonium salts, hexaalkylguanidinium salts, and mixtures thereof.

Suitable tertiary amines include triethylamine, tripropylamine, tributylamine, dimethylbutylamine, diisopropylethylamine, 2,2,6,6-tetramethylpiperidine, and mixtures thereof. Other contemplated tertiary amines include N—$C_1$-$C_6$-alkyl-pyrrolidines, such as N-ethylpyrrolidine, N—$C_1$-$C_6$-piperidines, such as N-ethylpiperidine, N-methylpiperidine, and N-isopropylpiperidine, N—$C_1$-$C_6$-morpholines, such as N-ethylmorpholine and N-isopropyl-morpholine, N—$C_1$-$C_6$-dihydroindoles, N—$C_1$-$C_6$-dihydroisoindoles, N—$C_1$-$C_6$-tetrahydroquinolines, N—$C_1$-$C_6$-tetrahydroisoquinolines, N—$C_1$-$C_6$-benzo-morpholines, 1-azabicyclo-[3.3.0]-octane, quinuclidine, N—$C_1$-$C_6$-alkyl-2-azabicyclo-[2.2.1]-octanes, N—$C_1$-$C_6$-alkyl-2-azabicyclo-[3.3.1]-nonanes, and N—$C_1$-$C_6$-alkyl-3-azabicyclo-[3.3.1]-nonanes, N,N,N',N'-tetraalkylalkylene-diamines, including N,N,N',N'-tetraethyl-1,6-hexanediamine. In various embodiments tertiary amines are triethylamine and N-ethylpiperidine. Also included are 4-dimethylaminopyridine, 4-pyrrolidino pyridine and other 4-dialkylaminopyridines.

When the catalyst consists of at least one tertiary amine alone, then the catalyst may be present in one embodiment at a total level of 0.1 to 10 mole %, in another embodiment at a total level of 0.2 to 6 mole %, in another embodiment at a total level of 1 to 4 mole %, and in still another embodiment at a total level of 2.5 to 4 mole % based on total molar amount of acid chloride groups. In one embodiment of the invention, all of the tertiary amine is present at the beginning of the reaction before addition of dicarboxylic acid dichloride to resorcinol moiety. In another embodiment a portion of any tertiary amine is present at the beginning of the reaction and a portion is added following or during addition of dicarboxylic acid dichloride to resorcinol moiety. In this latter embodiment the amount of any tertiary amine initially present with resorcinol moiety may range in one embodiment from about 0.005 wt % to about 10 wt %, in another embodiment from about 0.01 to about 5 wt %, and in still another embodiment from about 0.02 to about 3 wt % based on total amine.

Suitable quaternary ammonium salts, quaternary phosphonium salts, and hexaalkylguanidinium salts include halide salts such as tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT® 336), methyltri-$C_8$-$C_{10}$-alkyl-ammonium chloride (sometimes known as ADOGEN® 464), N,N,N',N',N'-pentaalkyl-alpha, omega-amine-ammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide, hexaalkylguanidinium halides, hexaethylguanidinium chloride, and the like, and mixtures thereof. Also included are hydroxides such as methyltributylammonium hydroxide.

Organic solvents substantially immiscible with water include those that in one embodiment are less than about 5 wt %, and in another embodiment less than about 2 wt % soluble in water under the reaction conditions. Suitable organic solvents include dichloromethane, trichloroethylene, tetrachloroethane, chloroform, 1,2-dichloroethane, toluene, xylene, trimethylbenzene, chlorobenzene, o-dichlorobenzene, and mixtures thereof. In a particular embodiment the solvent is dichloromethane.

For the first step (generation of resorcinol arylate polyester) the pH of the reaction mixture is maintained in some embodiments between about 3 and about 8.5, in other embodiment between about 4 and about 7, and in other embodiments between about 5 and about 8, throughout addition of the at least one dicarboxylic acid dichloride to the at least one resorcinol moiety. For the second step, the pH range is between about 8 and about 11, more specifically between about 9.5 and about 11.

Suitable reagents to maintain the pH include alkali metal hydroxides, alkaline earth hydroxides, and alkaline earth oxides. In some embodiments the reagents are potassium hydroxide and sodium hydroxide. In a particular embodiment the reagent is sodium hydroxide. The reagent to maintain pH may be included in the reaction mixture in any convenient form. In some embodiments said reagent is added to the reaction mixture as an aqueous solution simultaneously with the at least one dicarboxylic acid dichloride.

The temperature of the reaction mixture may be any convenient temperature that provides a rapid reaction rate and a resorcinol arylate-containing polymer substantially free of anhydride linkages. Convenient temperatures include those from about −20° C. to the boiling point of the water-organic solvent mixture under the reaction conditions. In one embodiment the reaction is performed at the boiling point of the organic solvent in the water-organic solvent mixture. In another embodiment the reaction is performed at the boiling point of dichloromethane.

Preferably, the total molar amount of acid chloride groups added to the reaction mixture is stoichiometrically deficient relative to the total molar amount of phenolic groups. This stoichiometric ratio is desirable so that hydrolysis of acid chloride groups is minimized, and so that nucleophiles such as phenolic and/or phenoxide may be present to destroy any adventitious anhydride linkages, should any form under the reaction conditions. The total molar amount of acid chloride groups includes the at least one dicarboxylic acid dichloride, and any mono-carboxylic acid chloride chain-stoppers and any tri- or tetra-carboxylic acid tri- or tetra-chloride branching agents which may be used. The total molar amount of phenolic groups includes resorcinol moieties, and any mono-phenolic chain-stoppers and any tri- or tetra-phenolic branching agents that may be used. The stoichiometric ratio of total phenolic groups to total acid chloride groups is in one embodiment about 1.5-1.01 to 1 and in another embodiment about 1.2-1.02 to 1.

In an embodiment, at least one chain-stopper (also referred to sometimes hereinafter as capping agent) may be present in the methods and compositions of the present invention. A purpose of adding at least one chain-stopper is to limit the molecular weight, thus providing polymer with controlled molecular weight and favorable processability. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, preferably in which about 47 to 89% of the hydrogen atoms are part of methyl groups as described in U.S. Pat. No. 4,334,053. For some embodiments a mono-phenolic UV absorber is used as capping agent. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. In some embodiments mono-phenolic chain-stoppers are phenol, tert-butylphenol, p-cumylphenol, and/or resorcinol monobenzoate.

Mono-carboxylic acid chlorides suitable as chain stoppers include monocyclic, mono-carboxylic acid chlorides, such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic mono-carboxylic acids, such as acryloyl chloride and methacryoyl chloride, are also suitable. Suitable mono-chloroformates include monocyclic mono-chloroformates, such as phenyl chloroformate, alkyl-substituted phenyl chloroformate, p-cumyl phenyl chloroformate, toluene chloroformate, and mixtures thereof.

In another embodiment, the invention may encompass the inclusion of at least one branching agent such as a trifunctional or higher functional carboxylic acid chloride and/or trifunctional or higher functional phenol. Such branching agents, if included, can typically be used in quantities of 0.005 to 1 mole %, based on dicarboxylic acid dichlorides or resorcinol moieties used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties while acid chloride branching agents may be introduced together with acid dichlorides.

Polymer Blends

The polymers and copolymers comprising thermally stable resorcinol arylate polyester chain members may be employed in blends with at least one other polymer, especially polycarbonates (hereinafter sometimes designated "PC"), polyesters, copolyestercarbonates, polyarylates, polyetherimides, polyphenylene ethers, and addition polymers. Related blends are disclosed in commonly owned U.S. Pat. No. 6,143,839. For example, such blends may be used for injection molding.

The polycarbonates in the blend compositions of the invention are, for the most part, similar in molecular structure to the carbonate blocks of the block copolyestercarbonate as described hereinabove, with bisphenol-A homo- and copolycarbonates generally being useful in some embodiments. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and especially poly(alkylene arenedioates), with poly(ethylene terephthalate) and poly(1,4-butylene terephthalate) being useful in some embodiments.

Multilayer Articles

The thermostable, weatherable polymers of the present invention may be applied to substrates to provide protection against UV induced degradation. Thus, in another embodiment, the present invention comprises multilayer articles comprising a substrate layer and least one coating layer thereon, said coating layer comprising at least one polymer comprising structural units derived from at least one 1,3-dihydroxybenzene moiety, at least one aromatic dicarboxylic acid moiety, at least one bisphenol moiety, and at least one soft-block moiety and prepared by methods embodied in the present invention.

In the present context a multilayer article is one containing at least two layers. In an embodiment, the substrate comprises at least one thermoplastic polymer, a thermoset polymer, a cellulosic material, glass, ceramic, or metal. Optionally, the multilayer articles may further comprise an interlayer, for example an adhesive interlayer, between any substrate layer and any thermally stable polymer coating layer.

Multilayer articles of the invention include, but are not limited to, those which comprise a substrate layer and a coating layer of said thermally stable polymer; those which comprise a substrate layer with a coating layer of said thermally stable polymer on each side of said substrate layer; and those which comprise a substrate layer and at least one coating layer of said thermally stable polymer with at least one interlayer between a substrate layer and a coating layer. Any interlayer may be transparent, translucent, or opaque, and/or may contain an additive, for example a colorant or decorative material such as metal flake. If desired, an overlayer may be included over the coating layer of thermally stable polymer, for example to provide abrasion or scratch resistance. The substrate layer, coating layer of thermally stable polymer, and any interlayers or overcoating layers are often in contiguous superposed contact with one another.

Within the context of the present invention, it should be understood that any coating layer comprising a thermally stable polymer comprising RP-co-PC/soft-block members may also include polymer comprising o-hydroxy-benzophenone or analogous chain members resulting from Fries rearrangement of said resorcinol arylate chain members, for example after exposure of said coating layer to UV-light. Typically, a preponderance of any polymer comprising o-hydroxy-benzophenone or analogous chain members will be on that side or sides of said coating layer exposed to UV-light and will overlay in a contiguous superposed layer or layers that polymer comprising unrearranged resorcinol arylate chain members. If the exposed layer is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

In an embodiment, the coating of the present invention may further comprise a stabilizer additive. Such additives may have a beneficial effect on color despite the fact that polymers comprising resorcinol arylate polyester chain members and their Fries rearrangement products themselves protect against photoyellowing. In the present context a stabilizer additive is an additive which provides one or both of lower initial color or additional resistance to weathering, as measured for example by initial yellowness index (YI), or by resistance to yellowing and change in color, when compared to a similar coating without at least one stabilizer additive. In a particular embodiment the stabilizer additive comprises at least one auxiliary color stabilizer additive. In another particular embodiment the stabilizer additive comprises at least one auxiliary light stabilizer additive. In one embodiment the presence of at least one auxiliary UV absorber as stabilizer additive provides additional resistance to weathering, for example as measured by initial yellowness index (YI), or resistance to yellowing and change in color, when compared to a similar coating without at least one auxiliary UV absorber.

The material of the substrate layer in the articles of this invention may include at least one thermoplastic polymer as described in commonly owned U.S. Pat. No. 6,306,507. Thermoplastic polymers include, but are not limited to, polycarbonates, particularly aromatic polycarbonates, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, polyesters, liquid crystalline polyesters, polyetheresters, polyetheramides, polyesteramides, and polyestercarbonates (other than those employed for the coating layer, as defined hereinafter). In some embodiments polycarbonates and polyesters are preferred. A substrate layer may additionally contain art-recognized additives including, but not limited to, colorants, pigments, dyes, impact modifiers, stabilizers, color stabilizers, heat stabilizers, UV screeners, UV absorbers, flame retardants, fillers, flow aids, ester interchange inhibitors, and mold release agents.

Suitable polycarbonate substrates include homopolycarbonates comprising structural units of the type described for the organic carbonate blocks in the copolyestercarbonates of the invention. In some embodiments the polycarbonates are bisphenol-A homo- and copolycarbonates. In various embodiments the weight average molecular weight of the initial polycarbonate ranges from about 5,000 to about 100,000; in other embodiments the weight average molecular weight ($M_w$) of the initial polycarbonate ranges from about 25,000 to about 65,000.

The polycarbonate substrate may also be a copolyestercarbonate (other than that copolyestercarbonate employed for the coating layer as defined hereinafter). Such copolymers typically comprise, in addition to the organic carbonate units, ester units such as isophthalate and/or terephthalate. The copolyestercarbonates which find use as substrates in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; and 4,506,065.

Polyester substrates include, but are not limited to, poly (alkylene dicarboxylates), especially poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate). Also included are polyarylates as described hereinabove, illustrative examples of which include those comprising structural units derived from bisphenol A, terephthalic acid, and isophthalic acid.

Additional polymer substrates include homo- and copolymeric aliphatic olefin and functionalized olefin polymers (which are homopolymers and copolymers comprising structural units derived from aliphatic olefins or functionalized olefins or both), and their alloys or blends. Illustrative examples include, but are not limited to, polyethylene, polypropylene, thermoplastic polyolefin ("TPO"), ethylene-propylene copolymer, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl(meth)acrylates such as poly(methyl methacrylate) ("PMMA"), and polymers of alkenylaromatic compounds such as polystyrenes, including syndiotactic polystyrene. In some embodiments the addition polymers are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/ polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers often constitute the major proportion thereof.

The substrate layer in the multilayer articles of this invention may also comprise at least one of any thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate comprises a RIM material. In another embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also include those comprising at least one glass layer. Typically any glass layer is a substrate layer, although multilayer articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is desirable that the interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any thermally stable polymer coating layer.

It is also within the scope of the invention for other polymers to be present which are miscible in at least some proportions with the coating layer of the present invention. Illustrative examples of at least partially miscible polymers include polyetherimide and polyesters such as PBT, PET, PTT, PEN, PBN, PETG, PCCD, and bisphenol-A polyarylate. In one embodiment the coating layer polymer consists essentially of thermally stable resorcinol arylate polyesters, copolyesters, or copolyestercarbonates.

In one embodiment, application of the at least one coating layer may be performed by solvent-casting. In another embodiment application of said coating layer comprises fabrication of a separate sheet thereof followed by application to the second layer, or by simultaneous production of both layers, typically in a melt process. Thus, there may be employed such methods as thermoforming, compression molding, co-injection molding, coextrusion, overmolding, blow molding, multi-shot injection molding and placement of a film of the coating layer material on the surface of the second layer followed by adhesion of the two layers, typically in an injection molding apparatus; e.g., in-mold decoration, or in a hot-press. These operations may be conducted under art-recognized conditions.

The articles of this invention are typically characterized by the usual beneficial properties of the substrate layer, in addition to weatherability as may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multi-layer articles may possess recycling capability, which makes it possible to employ the regrind material as a substrate for further production of articles of the invention.

Copolymer compositions that are substantially transparent and methods of forming these copolymer compositions are disclosed herein. Such copolymer compositions comprise arylate polyester units, aromatic carbonate units, and soft block moieties. General types of arylate polyester units for use in these compositions are those having Formula (XVII):

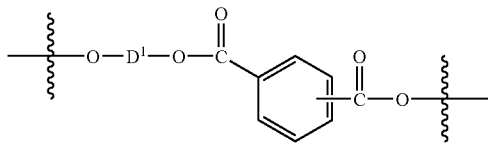

(Formula XVII)

wherein $D^1$ is the reaction residue of a dihydroxy aromatic compound, and wherein the polymer chain carboxyl groups on the aromatic acid radical may be distributed ortho-, meta-, or para- to one another on the aromatic ring. The term "reaction" where used in conjunction with a dihydroxy compound or dihydroxy aromatic compound may comprise the condensation product of these with a carbonyl group, functionalized silicon group, and the like. Specifically, where used in describing $D^1$, the term "reaction residue" refers to the organic radical portion of the dihydroxy aromatic compound, exclusive of terminal oxygen radicals of the hydroxy groups, which derives from the aforementioned condensation. Further, the aromatic acid radical may be a combination of one or more of the ortho-, meta-, or para-disubstituted forms. In one embodiment, $D^1$ is the reaction residue of a bisphenol of Formula V or Formula VIII, for example 1,1-bis(4-hydroxyphenyl)methane, 1,1-bis(4-hydroxyphenyl)ethane, bisphenol A, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, or a combination comprising at least one of the foregoing bisphenols.

In another embodiment, $D^1$ is the reaction residue of a resorcinol of Formula I, and the arylate polyester unit is a resorcinol arylate polyester unit of Formula III. Specifically, in this embodiment, $D^1$ is the reaction residue of resorcinol, 2-methyl resorcinol, and the like. Combinations comprising at least one of the foregoing resorcinol compounds may also be used. In a further embodiment, $D^1$ is a combination of a bisphenol and a resorcinol. The ratio of resorcinol to bisphenol may be 1:99 to 99:1.

Where a soft block moiety comprises a polysiloxane block, useful polysiloxane blocks comprise repeating diorganosiloxane units, also referred to as "siloxane units", of Formula (XVIII):

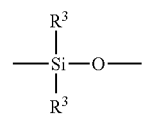

(Formula XVIII)

wherein each occurrence of $R^3$ may be the same or different and is independently a $C_{1-12}$ hydrocarbyl. The siloxane units are generally present in the form of blocks containing 1 to 1,000 siloxane units, specifically 10 to 100, more specifically 15 to 75, and most specifically 20 to 60. As is readily understood by one of ordinary skill in the art, the number of siloxane units represents an average value. In an embodiment, the average number of siloxane units present in a polysiloxane block is 1 to 100, more specifically 4 to 100, and more specifically 4 to 50. In a specific embodiment, the average number of siloxane units present in a polysiloxane block is 4 to 15. In another specific embodiment, the average number of siloxane units present in a polysiloxane block is 16 to 50.

A specific type of polysiloxane block comprises Formula (XIX):

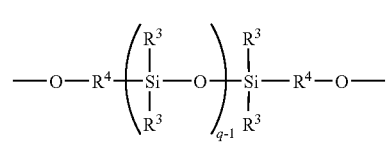

(Formula XIX)

wherein $R^3$ is as described above, q is 1 to 100, each occurrence of $R^4$ is independently a divalent $C_1$-$C_{30}$ hydrocarbylene, and wherein the polymerized polysiloxane block is the reaction residue of its corresponding dihydroxy compound. In an embodiment, q is 4 to 50, specifically 4 to 45, more specifically 4 to 40, and still more specifically 4 to 30. In a specific embodiment, q is 4 to 15, specifically 5 to 15, more specifically 6 to 15, and still more specifically 7 to 10. In another embodiment, q is 16 to 50, specifically 20 to 45, and more specifically 25 to 45. In one embodiment, each occurrence of $R^4$ independently is of Formula (XX):

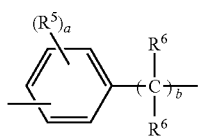

(Formula XX)

wherein each occurrence of $R^6$ is independently H or $C_1$-$C_{12}$ hydrocarbyl. Each $R^5$ in Formula (XX) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, and b is 1 to 8. Each a is independently 0, 1, 2, 3, or 4. In one embodiment, the arylene end has connectivity to an oxygen atom, and the alkylene end has connectivity to a silicon atom. In another embodiment, the oxygen substituent may be disposed ortho, meta, or para to the —$C(R^6)_2$— group.

The polysiloxane blocks may comprise repeatable structural units of the Formula (XXI):

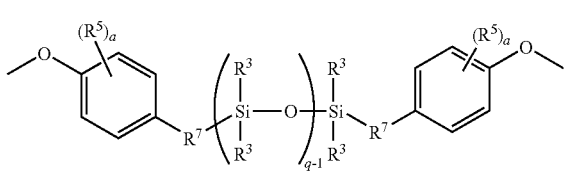

(Formula XXI)

wherein $R^3$ and $R^5$ are as described for Formulas XIX and XX above, q is 1 to 100, a is 0 to 4, $R^7$ is a divalent organic radical disposed in the para position relative to the backbone oxygen, and wherein the polymerized unit is the reaction residue of its corresponding dihydroxy compound. For example, $R^7$ may be a $C_1$-$C_{13}$ alkylene, $C_1$-$C_{13}$ alkyleneoxy, $C_2$-$C_{13}$ alkenyl, $C_2$-$C_{13}$ alkenyloxy, $C_3$-$C_6$ cycloalkylene, $C_3$-$C_6$ cycloalkleneoxy, $C_6$-$C_{10}$ arylene, $C_6$-$C_{10}$ aryleneoxy, $C_7$-$C_{13}$ aralkylene, $C_7$-$C_{13}$ aralkylenoxy, $C_7$-$C_{13}$ alkarylene, or $C_7$-$C_{13}$ alkaryleneoxy. Combinations of the foregoing $R^7$ groups may be used in the same copolymer. In one embodiment, each $R^3$ in Formula (XXI) may be the same or different, and is $C_{1-8}$ alkyl and $C_{6-13}$ aryl; a is 0 or 1; each $R^5$ is a $C_{1-3}$ alkoxy; and each $R^7$ is a $C_1$-$C_{13}$ alkylene. In another specific embodiment, each $R^3$ is a $C_1$-$C_3$ alkyl; each $R^5$ is a $C_1$-$C_3$ alkoxy or a $C_1$-$C_3$ alkyl; a is 1; and each $R^7$ is a dimethylene, trimethylene or tetramethylene. In another embodiment, each $R^3$ is methyl, each $R^5$ is methoxy, a is 1, and each $R^7$ is a divalent $C_1$-$C_3$ aliphatic group. In a specific embodiment, $R^3$ is methyl, each $R^5$ is methoxy, a is 1, each $R^7$ is a trimethylene group, $R^7$ and $R^5$ are substituted meta to each other, and $R^5$ is substituted ortho to the oxygen radical. In another specific embodiment, q is 4 to 50. In a more specific embodiment, q is 4 to 15. In another more specific embodiment, q is 16 to 50. Such units may be derived from hydroxyaromatic end-capped polysiloxanes of Formula XII.

The polysiloxane blocks may be repeatable structural units of Formula XXII:

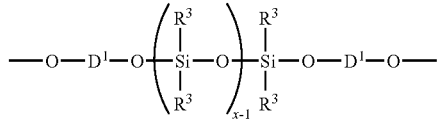

(Formula XXII)

wherein x is 1 to 100, $R^3$ is as defined in Formula XVIII, and $D^1$ is the reaction residue of a dihydroxy aromatic compound. In this Formula, the polysiloxane block is connected through an oxygen linkage to an end group, wherein each end group is independently the reaction residue of a dihydroxy compound of the Formula HO-$D^1$-OH. In one embodiment, the dihydroxy compound is a dihydroxy aromatic compound of Formula VIII. In another embodiment, the dihydroxy aromatic compound is a resorcinol of Formula III. In another embodiment, the dihydroxy compound is a combination comprising a resorcinol of Formula III or a bisphenol of Formula VIII. In an embodiment, each $R^3$ in Formula XXII may be the same or different, and is $C_{1-8}$ alkyl or $C_{6-13}$ aryl. In another specific embodiment, each $R^3$ is a $C_1$-$C_3$ alkyl. In a specific embodiment, each $R^3$ is methyl, and $D^1$ is an aromatic group and may be represented by Ar as defined above. In a specific embodiment, x is to 100. In a more specific embodiment, x is 4 to 50, specifically 5 to 50, and more specifically 7 to 45. Such units may be derived from hydroxyaryl terminated polysiloxanes of Formula XVI.

Hydroxyaryl-terminated polysiloxanes can be made by effecting a platinum catalyzed addition between an aliphatically unsaturated monohydric phenol and a siloxane of the Formula XXIII:

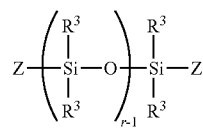

(Formula XXIII)

wherein $R^3$ is as previously defined in Formula XVIII, r is 1 to 100, and Z is H. Some of the aliphatically unsaturated monohydric phenols that can be used to make hydroxyaryl-terminated poly(diorganosiloxane)s are, for example, 4-allyl phenol, 4-allyl-2-methoxy phenol (eugenol), 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 2-allyl-4,6-dimethylphenol, and the like.

Hydroxyaryl-terminated polysiloxanes can also be prepared by the condensation of hydride-terminated polysiloxane of Formula XXIII, wherein Z is H, with a halomethyl- or sulfonatomethylene-substituted aromatic compound in the presence of a base or copper catalyst, followed by the removal of any hydroxyl protecting group used, such as acetate or trimethylsilyl. Suitable halomethyl- or sulfonatomethylene-substituted aromatic compounds of this type include 4-acetoxybenzyl chloride, 4-trimethylsilylbenzyl chloride, 4-methoxymethyloxybenzyl chloride, 4-acetoxybenzyl toluenesulfonate, 4 trimethylsilylbenzyl toluenesulfonate, and the like.

Hydroxyaryl-terminated polysiloxanes can also be prepared by the condensation of: polysiloxane of Formula XXIII, wherein Z is acetoxy or halogen, specifically Cl, with a dihydroxy aromatic compound of Formula VIII, optionally in the presence of a base or other catalyst. Exemplary dihydroxy compounds of Formula VIII for this purpose include, but are not limited to, 1,1-bis(4-hydroxyphenyl) methane, 1,1-bis(4-hydroxyphenyl)ethane, bisphenol A, 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. In addition, hydroxyaryl-terminated polysiloxanes can also be prepared by the condensation of a polysiloxane of Formula XXIII, wherein Z is acetoxy or halogen, specifically Cl, with a dihydroxy aromatic compound of Formula I, optionally in the presence of a base or other catalyst. Exemplary dihydroxy aromatic compounds of Formula I include 1,2-dihydroxybenzene, 1,3-dihydroxybenzene (resorcinol), 1,4-dihydroxybenzene (p-hydroquinone), 2-methyl-resorcinol, 2-bromoresorcinol, and the like. Combinations comprising at least one of the foregoing dihydroxy compounds may also be used.

In an embodiment, the copolymer composition comprises a polysiloxane block, an arylate block, and a carbonate block. In a specific embodiment, the arylate blocks comprise arylate polyester units of Formula III, prepared from an aromatic dicarboxylic acid derivative and a dihydroxy aromatic compound of Formula I, or a combination of dihydroxy aromatic compounds of Formulas I and VIII. In another embodiment, the copolymer composition comprises polysiloxane blocks and polyarylate-polycarbonate blocks of Formula IV.

In an embodiment, the arylate block of the combined polyarylate-polycarbonate blocks comprises the reaction product of a combination of isophthalic and/or terephthalic diacids (or derivatives thereof) with a dihydroxy compound of Formula I, wherein the molar ratio of isophthalate units to terephthalate units is 99:1 to 1:99, specifically 95:5 to 5:95, more specifically 90:10 to 10:90, and still more specifically 80:20 to 20:80. In an embodiment, the molar ratio of the isophthalate-terephthalate-resorcinol ester units to the aromatic carbonate units in the polyarylate-polycarbonate can be 1:99 to 99:1, specifically 5:95 to 95:5, more specifically 10:90 to 95:5.

In another embodiment, the polyarylate-polycarbonate block has the general structure shown in Formula IV. A polyarylate-polycarbonate block comprises, in addition to the arylate block comprising arylate polyester units, resorcinol carbonate units where $R^x$ of Formula IV is derived from a resorcinol of Formula I, or a combination of resorcinol carbonate units and bisphenol carbonate units where $R^x$ of Formula IV is derived from a bisphenol of Formula VIII, in a molar ratio of resorcinol carbonate units to bisphenol carbonate units of 1:99 to 100:0. In a specific embodiment, the aromatic carbonate units are derived from resorcinol (i.e., 1,3-dihydroxybenzene) or a combination comprising resorcinol and bisphenol-A. In a specific embodiment, the polyarylate-polycarbonate block is a poly(isophthalate-terephthalate-resorcinol ester)-co-(resorcinol carbonate)-co-(bisphenol-A carbonate) polymer.

In a specific embodiment, the arylate blocks have a degree of polymerization (DP), represented by m in Formula IV, of 4 to 40, specifically 8 to 30, and more specifically 8 to 25. In another specific embodiment, the carbonate blocks, have a degree of polymerization (DP) represented by p in Formula IV, of 4 to 25, specifically 5 to 20, and more specifically 6 to 10.

In an embodiment, the polyarylate-polycarbonate blocks of the copolymer composition comprise 50 to 99 mole percent (mol %) of arylate polyester units, and specifically 50 to 95 mol % arylate polyester units, and more specifically 55 to 95 mol % arylate polyester units, wherein the sum of the mole percentages of arylate polyester units and aromatic carbonate units is 100 mol %. In an embodiment, the aromatic carbonate units comprise 1 to 30 mol % resorcinol carbonate units, specifically 1 to 20 mol % resorcinol carbonate units, and more specifically 5 to 20 mol % resorcinol carbonate units; and 0 to 35 mol % bisphenol carbonate units, specifically 5 to 35 mol % bisphenol carbonate units, and more specifically 5 to 30 mol % bisphenol carbonate units.

In an embodiment, the copolymer composition comprises a polysiloxane block comprising siloxane units, and an arylate block consisting essentially of arylate polyester units and aromatic carbonate units. In another embodiment, the copolymer composition consists essentially of a polysiloxane block comprising siloxane units, and an arylate block consisting essentially of arylate polyester units and aromatic carbonate units.

In addition, where the soft block moiety is a polysiloxane block comprising siloxane units of Formula XVIII, the siloxane units of the polysiloxane block may be present in the copolymer composition from 0.1 to 25 weight percent (wt %), specifically from 0.75 wt % to 20 wt %, and more specifically from 1 wt % to 10 wt % of the total weight of the copolymer composition. In another embodiment, the siloxane units of the polysiloxane block may be present in the copolymer composition in an amount of 0.1 to 25 wt %, specifically 0.15 to 15 wt %, more specifically 0.2 to 10 wt %, more specifically 0.2 to 6 wt %, still more specifically 0.2 to 5 wt %, and still more specifically 0.25 to 2 wt %, based on the total weight of the copolymer composition.

In an embodiment, the copolymer composition comprises 50 to 99 mole percent (mol %) arylate polyester units, specifically 50 to 95 mol % arylate polyester units, and more specifically 55 to 95 mol % of arylate polyester units; 1 to 50 mol % aromatic carbonate units, specifically 1 to 35 mol % aromatic carbonate units, and more specifically 5 to 30 mol % of aromatic carbonate units; and 0.0001 to 0.025 mol % polysiloxane blocks, specifically 0.0005 to 0.02 mol % polysiloxane blocks, and more specifically 0.001 to 0.015 mol % polysiloxane blocks, wherein the sum of the mole percentages of arylate polyester units, aromatic carbonate units, and polysiloxane blocks is 100 mole percent, and the polysiloxane blocks. In a specific embodiment, the copolymer composition is a polysiloxane-polyarylate-polycarbonate, also referred to herein as a poly(resorcinol arylate polysiloxane polycarbonate), consisting essentially of the arylate polyester units, aromatic carbonate units, and soft block moiety. In an embodiment, the soft block moiety is a polysiloxane block.

Also in an embodiment, the polysiloxane-polyarylate-polycarbonate comprises 50 to 98.8 wt % arylate polyester units, specifically 60 to 94.8 wt % arylate polyester units, and more specifically 60 to 94.8 wt % arylate polyester units; 1 to 49.8 wt % aromatic carbonate units, specifically 3 to 39.8 wt % aromatic carbonate units, and more specifically 4 to 39.8 wt % aromatic carbonate units; and 0.2 to 10 wt %, polysiloxane blocks, specifically 0.2 to 6 wt % polysiloxane blocks, and more specifically 0.25 to 2 wt % polysiloxane blocks, wherein the sum of the weight percentages of the polysiloxane blocks, arylate polyester units, and aromatic carbonate units is 100 wt %. In a specific embodiment, the copolymer composition is a polysiloxane-polyarylate-polycarbonate consisting essentially of the arylate polyester units, aromatic carbonate units, and soft block moiety. In an embodiment, the soft block moiety is a polysiloxane block.

Individual occurrences of the soft-block moiety are substantially linked to each other by at least one spacer unit, wherein a spacer unit comprises one or more arylate polyester units, one or more aromatic carbonate units, or a combination of each of these. The term "substantially linked", as used herein, means that greater than or equal to 90 mol %, specifically greater than or equal to 95 mol %, more specifically greater than or equal to 99 mol %, and most specifically greater than or equal to 99.5 mol % of the soft block moieties are linked by a spacer unit as defined above.

In an embodiment, a soft block moiety is a polysiloxane block comprising siloxane units of Formulas XVIII, and a spacer unit is one or more resorcinol arylate polyester units, one or more bisphenol polyester units, one or more aromatic carbonate units, or a combination of two or more of each of these.

Soft block moieties may be randomly distributed within the polymer chain. As used herein, "randomly distributed" means that any two occurrences of a soft block moiety are linked to each other by a random number of spacer units. Specifically, occurrences of the soft block moiety may be substantially randomly distributed within the polymer chain. As used herein, "substantially randomly distributed" means that greater than or equal to 95 mol %, specifically greater than or equal to 99 mol %, or most specifically greater than or equal to 99.5 mol % of occurrences of a soft block moiety are randomly distributed as determined by proton nuclear magnetic resonance (NMR) spectroscopy.

The copolymer composition has a light transmission greater than or equal to 55%, specifically greater than or equal to 60% and more specifically greater than or equal to 70%, determined using a molded article having a thickness of 3.2 mm ±0.12 mm and consisting of the copolymer composition, according to ASTM D1003-00. The copolymer composition may also have a haze less than or equal to 30%, specifically less than or equal to 25%, and most specifically less than or equal to 20% determined using a molded article having a thickness of 3.2 mm±0.12 mm and consisting of the copolymer composition, according to ASTM D1003-00.

Without being bound by theory, where the soft block moiety is a polysiloxane block, it is believed that on a molecular scale both the transparency and haze of a copolymer composition comprising polysiloxane blocks are each related to the number of polysiloxane blocks within the polymer chain, the average size of the polysiloxane block (as defined by the number of repeating diorganosiloxane subunits of Formula XVIII), the evenness of the distribution of the polysiloxane blocks through the polymer chain, or a combination of one or more of these factors. It is believed that a copolymer has a greater degree of transparency and a lesser degree of haze when the distance between siloxane blocks is maximized within the copolymer chain. Reaction conditions, relative amounts of starting materials, and/or types of starting materials may therefore be selected so as to adjust the distribution of the polysiloxane blocks, and thus the transparency and haze of the composition.

Polysiloxane blocks dispersed non-randomly in a copolymer composition may self-aggregate into polysiloxane-containing regions within the copolymer composition, absent a mechanism to prevent, minimize, or mitigate their aggregation. The difference in refractive indices between regions of polysiloxane blocks, and the surrounding regions comprising aromatic polyesters or polycarbonates, can lead to substantial scattering of incident light wherein sufficient numbers of polysiloxane regions of sufficient size are present. This may lead at least to the presence of haze, at most the opacity of the copolymer, and correspondingly at least to a diminished light transmission through a film comprising the copolymer. Minimizing the formation of regions of polysiloxane blocks during the reaction to form a copolymer may therefore lead to increased transparency and lower haze in copolymer compositions comprising polysiloxanes.

A cause of non-random distribution of units in a copolymer may be attributed to different reactivities of polymerizable units present in the polymerization reaction. Dihydroxy compounds comprising soft block moieties, specifically where soft block moieties comprising polysiloxane blocks of Formulas XIX and XXII, are believed to have a different reactivity toward phosgenation and subsequent reaction with dihydroxy compounds, than a dihydroxy compounds comprising an arylate polyester unit or a dihydroxy compound of Formula VIII. More specifically, polysiloxane blocks having end groups of Formula XX may have substituent groups $R^5$ disposed ortho to the oxygen radical that provides backbone connectivity. One skilled in the art will appreciate that a substituent group substituted ortho to a reactive site provides a steric barrier and may decrease reactivity of the reactive site. Other factors affecting the reactivity includes multiple substituents, for example, in Formula XX, wherein a is greater than 1; the size of the $R^5$ substituent, wherein a larger substituent decreases reactivity further; electronic effects such as deactivating substituents such as carboxylate groups or activating substituents such as hydroxyl groups; and the intramolecular structure of the polysiloxane block. Another factor affecting the reactivity of a reactive site is the nature of the reactive site, wherein a polar reactive site such as, for example, a hydroxyl group, may hydrogen bond to another hydroxyl group in an inter- or intramolecular interaction, and further decrease the reactivity of the group. A non-random distribution of polysiloxane in the copolymer chain can occur with the use of polysiloxanes of Formula XVI (having end groups derived from a bisphenol such as bisphenol A, or a resorcinol) which can react significantly faster with diacid chlorides or phosgene than either a eugenol-capped polysiloxane of Formula XVIII, a resorcinol, a bisphenol, or the hydroxyl-capped arylate block, because of its excellent solubility in the organic phase and its unhindered hydroxyl groups. It will be further appreciated that reference to a reactive site or reactive group refers to the portion of the polysiloxane block that participates in the formation of a carbonate or ester bond in a polymerization reaction. An effect of this lower reactivity may be the formation of non-uniformly distributed soft block moieties in the polymer chain, where the soft block moieties are not substantially separated. By adjusting the reactivity of the reactants in the polymerization reaction, a more random distribution may be effected.

One method of forming randomly distributed soft block moieties in copolymer compositions during the polymerization reaction is to provide copolymerizable reactants which have substantially the same reactivity toward each other. This may be accomplished by pre-reacting all of the polymerizable units, including the least reactive unit, with a reactive component of polymerization reaction, to form separate units with a substantially equivalent degree of reactivity. In an embodiment, both a dihydroxy aromatic compound comprising arylate polyester units of Formula XVII and a dihydroxy aromatic compound comprising Formula VIII are each believed to have higher reactivities than a soft block moiety comprising a dihydroxy aromatic compound comprising a polysiloxane block of Formula XXI, when subject to carbonylation reaction conditions to form a polycarbonate. A method of imparting each of these dihydroxy aromatic compounds with substantially equivalent reactivity is to prepare the bis-haloformates of each, and react the bis-haloformates with a dihydroxy aromatic compound to form a polycarbonate structure. Bis-haloformates may not react with one another directly but may substantially react with the dihydroxy aromatic compound, thereby disposing at least one dihydroxy aromatic compound between any two bis-haloformates, and forming carbonate linkage on at least one end of the dihydroxy aromatic compound. A spacer unit may thus form by this reaction wherein a carbonate linkage is formed one each end of a dihydroxy aromatic compound. By forming the carbonate linkages in this way, a substantially random distribution of polysiloxane blocks may be achieved within the polymer chain. It has been found that the size of the polysiloxane blocks can affect the transparency of the polysiloxane-containing polymer. This can be observed when the polysiloxane block has a larger size, i.e., greater than 50 siloxane units, specifically greater than 40 siloxane units, more specifically greater than 20 siloxane units, or even more specifically greater than 15 siloxane units. The polysiloxane blocks of this size may order to form regions (sometimes referred to herein as "domains") that have discrete boundaries with the surrounding phase. A domain may be defined as a region separated from the surrounding matrix, having a discrete and observable boundary separating it from the surrounding matrix, i.e., a phase-separated region. The presence of individual domains may be observed by appropriate analytical methods such as transmission electron microscopy (TEM). These domains can vary greatly in size, but can typically have a long dimension of 20 to 200 nanometers or longer in contiguous length, with the length often coincident with the direction of flow of the copolymer composition during extrusion or injection molding. It is believed that the presence of these phase-separated regions, i.e., domains, in the copolymer can scatter incident light. Increasing the size of the phase-separated regions, increasing the numbers of phase-separated regions, and increasing the intra-chain concentration of the polysiloxane blocks, are each individually believed to correlate to increased scatter of incident light. The formation of domains can thus be observed using bulk property measurements including haze and/or light transmission measurements.

Thus, absent a mechanism to prevent, reduce, mitigate, or eliminate the formation of these phase-separated regions, such domains may be observed to form where combinations of dissimilar, immiscible polymer blocks are used. Mechanisms for controlling the formation of domains include limiting block size, limiting the concentration of blocks in the copolymer, and increasing the randomness and homogeneity of the blocks distributed in the polycarbonate. Thus, smaller phase-separated regions and decreased numbers of phase-separated regions may decrease the amount of scattered incident light, and thereby decrease the measurable haze of the combination, and where desired, provide an increase in the transparency.

It is therefore desirable to have polysiloxane blocks of sufficient size for the polysiloxane block of the copolymer composition that is large enough to ensure that the copolymer composition has the desired mechanical and/or melt properties (e.g., notched izod impact, MVR, etc.), and where the polysiloxane blocks are sufficiently substantially uniformly distributed within the matrix of the copolymer composition such that the blocks do not aggregate and/or otherwise form domains of a size that can cause observable light scattering leading to decreased transparency and/or increased haze.

Surprisingly, a copolymer composition comprising low levels (less than or equal to 10 wt %) of a polysiloxane block having relatively low numbers of siloxane repeat units (i.e., 4 to 50 siloxane units) distributed in the polyester block, polycarbonate block, or in both the polyester and polycarbonate blocks, has a high transparency determined using a molded article consisting of the copolymer composition. The copolymer composition has desirable notched izod impact strength, and melt properties for molding and/or thermoforming. Copolymer compositions having polysiloxane blocks with an average of 4 to 50 siloxane units per polysiloxane block, and as copolymerized and distributed therein, may be prepared by any known polycarbonate, polyester, or polyester-polycarbonate reaction. The resulting copolymer composition is desirably transparent.

While it is not required to provide an explanation of how an invention works, such theories may be useful to for the purposes of better helping the reader to comprehend the invention. Thus, it is to be understood that the claims are not to be limited by the following theory of operation. It is believed that relatively small size of the siloxane blocks (where the number of siloxane units is less than or equal to 50), and the low concentration of the blocks as a weight percentage of the copolymer composition provides for a more completely miscible polysiloxane block which, where a domain can form, provides a domain having a size of less than 20 nm in the longest dimension. The interphase boundary between the resulting phases is therefore sufficiently small such that scattering of incident light is minimized, and the polymer composition attains a transparent appearance. The reduction, mitigation, or elimination of these phase-separated regions provides a copolymer composition having very low scattering of incident light, and hence low haze.

As a further advantage to the copolymer composition, the high transparency of the polysiloxane-block containing copolymer composition also provides a basis for high color capability for colored compositions prepared using the copolymer composition. Where the transparency of a copolymer composition is high, as measured using a combination of low haze, and where desirable low color, a colorant (i.e., pigment or dye) added to the copolymer composition can provide a truer color. In the instance of low color copolymer compositions, a color composition prepared from a copolymer composition having a lower number of siloxane units (i.e., an average of 4 to 50 siloxane units per polysiloxane block) can have a lower baseline color than a copolymer composition prepared using polysiloxane blocks with a high number (i.e., greater than 50) of siloxane units per block. The lower haze of the copolymer composition prepared using the lower siloxane unit polysiloxane blocks thus means a lower degree of light scattering, and hence a lower whiteness, where increasing haze correlates to increasing whiteness in a composition. Colored compositions prepared using the copolymer composition having less haze therefore has less observable whiteness in the colored composition, and thus better color capability. Color compositions prepared from the copolymer composition may be opaque, translucent, or transparent, where each of these has high color capability. In a specific embodiment, a copolymer composition copolymer comprising low levels (less than or equal to 10 wt %) of a polysiloxane block having relatively low numbers of siloxane repeat units (i.e., 4 to 15 siloxane units) distributed in the polycarbonate block or in both the polyester and polycarbonate blocks, has low haze and excellent color capability.

Further, the low haze of the copolymer composition copolymer with polysiloxane blocks provides for copolymer compositions having other desirable properties such as high gloss retention and good weatherability. Arylates, specifically isophthalate-terephthalate-resorcinol arylates (also referred to as ITR arylates), provide excellent weatherability and resistance to photoyellowing. It is believed that the use of ITR arylates in the copolymer composition provides excellent weathering according to an appropriate weathering protocol, such as that according to ASTM G155-04a.

Also surprisingly, in an embodiment, a low loading of less than or equal to 1 weight percent of the polysiloxane block in the copolymer composition is sufficient to provide the desired transparency while maintaining the other desired properties (e.g., impact strength, ductility, color capability, etc.). It will be understood by one skilled in the art that within such a limitation, combinations of parameters including polysiloxane block size, number of polysiloxane blocks, distribution of polysiloxane blocks, and composition of the polysiloxane blocks, may also each be adjusted with respect to the other within the compositional parameters provided to achieve desirable haze and impact property performance from the copolymer composition. Compositions comprising the copolymer compositions disclosed herein may further have improved ductility, and lower shear stress than other impact modified, weatherable polyester-polycarbonates.

The copolymer composition from which the article for testing is molded can contain additives typically included with polycarbonates, such as thermal stabilizers, mold release agents, and antioxidants, wherein the presence of these additives in an amount effective to perform the intended function does not significantly adversely affect the desired properties of the copolymer composition. Typically the total amount of these additives is less than or equal to 5 weight percent (wt %), specifically less than or equal to 1 wt %, of the total weight of components present in copolymer composition.

Thus, in an embodiment, a molded article having a thickness of 3.2±0.12 millimeters and consisting of the copolymer composition has a light transmittance (% T) of greater than or equal to 70%, more specifically greater than or equal to 75%, and still yet more specifically greater than or equal to 80%, when measured according to ASTM D1003-00.

In another embodiment, a molded article having a thickness of 3.2±0.12 millimeters and consisting of the copolymer composition may have a haze of less than or equal to 10%, specifically less than or equal to 5%, more specifically less than or equal to 3%, still more specifically less than or equal to 2.5%, and still yet more specifically less than or equal to 2%, when measured according to ASTM D1003-00.

The copolymer composition can have low intrinsic (i.e., baseline) color, specifically low whiteness. The color capability of the copolymer composition can be determined spectrophotometrically against a standard composition comprising the same color composition in the same concentration, and classified according to the CIELAB color measurement method detailed by CIE (Commission Internationale de l'Eclairage). The values of $E^*$, $L^*$, $a^*$ and $b^*$, used to describe the color space of a test material, are related by the equation:

$$\Delta E^*_{ab} = [(\Delta L^*)^2 + (\Delta a^*)^2 + (\Delta b^*)^2]^{0.5}.$$

In this equation, $L^*$ represents the difference between light ($L^* = 100$) and dark ($L^* = 0$). The value $a^*$ represents the difference between green ($-a^*$) and red ($+a^*$), and $b^*$ represents the difference between yellow ($+b^*$) and blue ($-b^*$). The value of each parameter represents the magnitude of the difference in color. The net deviation for color capability is given by the overall deviation value $E^*$, which is the Euclidean distance between two points in a three dimensional space. Thus, the separation between points $a^*$ and $b^*$, and therefore the net deviation from the standard color, is given by the overall deviation value $\Delta E^*_{ab}$. The color capability of the copolymer composition, as determined spectrophotometrically using the method of CIELAB, may have a deviation of less than or equal to about 0.5 for the overall deviation value $\Delta E^*_{ab}$.

Copolymer compositions prepared using less than or equal to 10 wt % of polysiloxane blocks having 4 to 50 siloxane units may be prepared using any method typically used to prepare polycarbonates, polyesters, or polyester-polycarbonates. Exemplary methods include: typical (also referred to as "one pot") copolymerization methods, wherein the co-reactants are combined without accounting for the differences in reactivities of the polymerizable components; pre-reaction methods, in which the differences in reactivities of the polymerizable components are accounted for through the polymerization reaction conditions (e.g., order and/or timing of addition of the components, or timing of the reaction); or haloformate methods, in particular chloroformate processes, in which the differences in the reactivities of the polymerizable components is accounted for through the use of prior chemical modification of one or more of the polymerization components to ensure comparable reactivity of all similar co-reactants. Haloformate methods as disclosed herein comprise the formation of the haloformate of a polysiloxane block precursor having hydroxy functional groups. Such haloformates can be formed in situ, or can be prepared and isolated prior to use. A combination of these methods may be used to provide the desired copolymer composition, and may be determined by experimentation conducted by one skilled in the art. Methods used to adjust the randomness of the distribution of the polysiloxane blocks in the polymerization reaction, based on the reactivities of the polymerizable components, are useful to provide high transparency and/or low haze copolymer compositions when larger polysiloxane blocks (greater than 15 siloxane units to less than or equal to 50 siloxane units per polysiloxane block) are used.

In an embodiment, a copolymer composition copolymer comprising low levels (less than or equal to 10 wt %) of a polysiloxane block having relatively high numbers of siloxane repeat units (i.e., greater than 15 to less than or equal to 50 siloxane units) distributed in the polycarbonate block or in both the arylate and carbonate blocks, has high transparency and low haze, when prepared using a polymerization method designed to substantially randomly disperse the polysiloxane block in the copolymer composition, such as using a pre-reaction method as found in Example 2 of U.S. Pat. No. 6,861,482 to Brunelle et. al., which is incorporated herein by reference in its entirety, or by using a haloformate method. Copolymer compositions having 4 to 15 siloxane units per polysiloxane block, and having high transparency and low haze, can be prepared using either a typical copolymerization method, a pre-reaction method, or a haloformate reaction. It is believed the polysiloxane block precursor component having a low number of siloxane units (i.e., 4 to 15 siloxane units) can distribute sufficiently randomly to provide high transparency and low haze in the copolymer composition using any of the above methods.

Where a typical copolymerization or pre-reaction method is used, the polysiloxane block precursor compound may be copolymerized with the precursor compounds to the arylate polyester units, the aromatic carbonate units, or both the arylate polyester units and the aromatic carbonate units. In an embodiment, the polysiloxane block precursor compound is functionalized with hydroxyaromatic end groups, and is also referred to as a hydroxyaromatic end-capped polysiloxane.

Where a haloformate method is used, the polysiloxane block precursor compound is copolymerized with the precursors to the aromatic carbonate units.

Suitable haloformate methods for forming copolymer compositions comprising randomly dispersed, substantially separated soft block moieties are disclosed. For example, dihydroxy compounds comprising arylate polyester units, dihydroxy compounds comprising soft block moieties, and optionally dihydroxy aromatic compounds such as a bisphenol of Formula VIII, are each individually reacted with a carbonyl halide at a pH of 2 to 11, specifically at a pH of 4 to 10, and most specifically at a pH of 4 to 7 to form the respective bis-haloformates. The bis-haloformates are reacted with a dihydroxy compound and an interfacial polymerization catalyst to form the copolymer composition at a pH of 8 to 13, specifically at a pH of 8 to 11. In an embodiment, wherein the arylate polyester unit has one or more acyl end groups, the acyl end groups may substantially form the corresponding acid halides upon treatment with a carbonyl halide at a pH of 3 to 8. The arylate polyester unit may be substantially present as a bis-haloformate, a bis acyl halide, a mono acyl halide/mono-haloformate, a bis acyl haloformate, a mono acyl haloformate/mono acyl halide, a mono acyl haloformate/mono-haloformate, a combination of two or more of these, and the like. For the purpose of the discussion below and as used herein, the term "bis-haloformate" may comprise each of these substantially functionally equivalent bis acid halides.

In an embodiment, a method for preparing copolymer compositions comprising randomly dispersed polysiloxanes uses haloformates of general Formula XXIV:

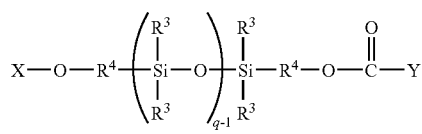

(Formula XXIV)

and Formula XXV:

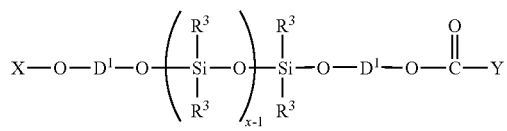

(Formula XXV)

as a reactive component, wherein $R^3$, $R^4$, $D^1$, q, and x are as defined for Formulas XIX and XXII above; X is H, —COF, —COCl, —COBr, or —COI; and Y is a halogen including F, Cl, Br, or I. Where X is H, a mono-haloformate is provided. Where X is —COF, —COCl, —COBr, or —COI, a bis-haloformate is provided.

For example, in one method, the bis-haloformates of each of an arylate polyester unit, a dihydroxy compound comprising a soft block moiety, and optionally a dihydroxy compound of Formula VIII are formed in situ in a reaction medium further comprising a carbonyl halide, specifically phosgene, and the reaction medium is at a pH of 2 to 11, specifically at a pH of 4 to 10, and most specifically at a pH of 4 to 7. In a specific example, wherein the soft block moiety comprises a dihydroxy compound of Formula XII, a bis-haloformate of Formula XXVI (where X is —COCl, and Y is —Cl) is substantially formed:

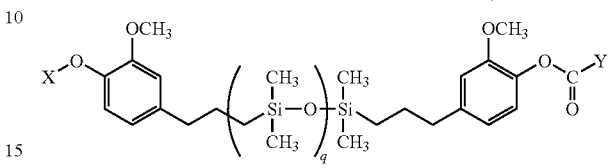

(Formula XXVI)

where q is as defined for Formula XII.

It is believed that the reactivity of a bis-haloformate of Formula XXVI (where X is COCl, and Y is Cl), toward a dihydroxy compound, is comparable to that of a bis-haloformate formed of a dihydroxy compound comprising an arylate polyester unit, and is also comparable to the reactivity of a bis-haloformate of a dihydroxy compound of Formula VIII. However, it will also be appreciated that a minimal amount of the mono-haloformate (Formula XXVI, where X is H and Y is Cl) may be formed during the bis-haloformate reaction, and a smaller amount of the dihydroxy compound of Formula XII may also remain as an unreacted portion. It will be further appreciated that the presence of these may lead to the formation of undesired single carbonate linkages between soft block moieties during subsequent formation of a copolymer composition.

In another embodiment, one or more dihydroxy compounds may be individually reacted with a carbonyl source to substantially form the individual bis-haloformates. For example, one method of substantially forming the bis-haloformate of a dihydroxy compound comprising a polysiloxane block is described in U.S. Pat. No. 6,728,364 to Silva et al, incorporated herein by reference. This method involves passing the dihydroxy compound and a carbonyl halide, specifically phosgene, and a catalyst such as sodium hydroxide in aqueous solution, simultaneously through a heated tube reactor to form the bis-haloformate of the dihydroxy compound in a continuous process. An advantage to this process is that the bis-haloformates are formed in high yield, minimizing the formation of mono-haloformate intermediates which may lead to undesirable single carbonate linkages between polysiloxane blocks. In a specific embodiment, a soft block moiety comprising the dihydroxy compound of Formula XII is reacted, under the above conditions, with phosgene to form bis-haloformate of Formula XXVI (X is —COCl, Y is —Cl).

In a specific embodiment, where a hydroxyaromatic end-capped polysiloxane precursor (i.e., polysiloxane having hydroxyaromatic end groups) to the polysiloxane block of general Formula XXII (where Ar is derived from bisphenol-A) is copolymerized with an aromatic diacid dichloride, an ester linked structure is formed as shown in Formula XXVII:

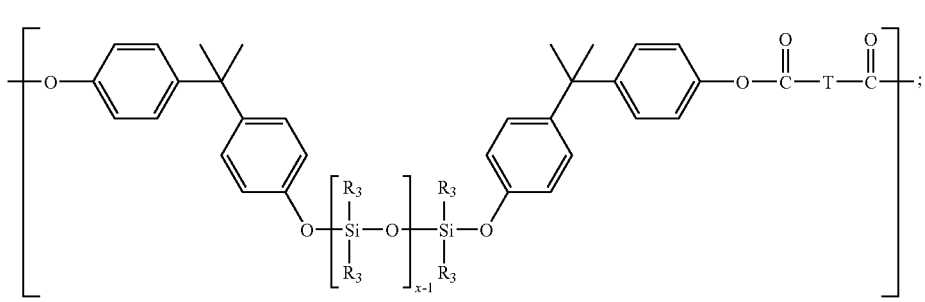

Formula XXVII or, where a hydroxyaromatic end-capped polysiloxane precursor to the polysiloxane block of general Formula XXII (where Ar is the reaction product of bisphenol-A) is copolymerized with a carbonate precursor or haloformate, a carbonate linked structure is formed as shown in Formula XXVIII:

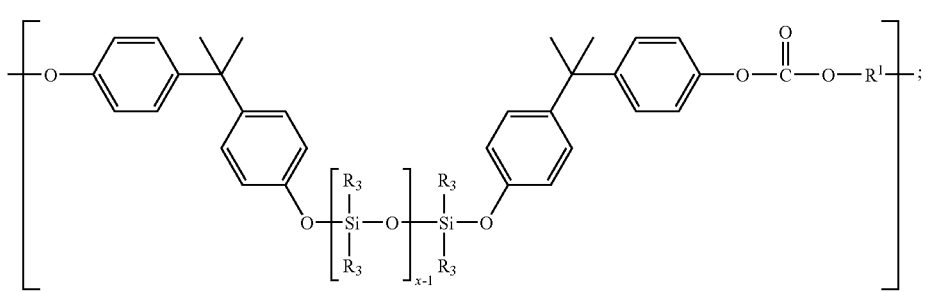

Formula XXVIII or a combination comprising these polysiloxanes, wherein for both Formulas XXVII and XXVIII, $R_3$ and x are as described for Formula XXII, above; T in Formula XXVII is a $C_{6-30}$ arylene group; and $R^1$ in Formula XXVIII is a $C_{6-30}$ arylene group. In an embodiment, T is derived from the reaction product of a reactive derivative of isophthalic and/or terephthalic acid. In an embodiment, $R^1$ is derived from the carbonate reaction product of a resorcinol of Formula I, or a combination of a resorcinol of Formula I and a bisphenol of Formula VIII.

In another specific embodiment, where a hydroxyaromatic end-capped polysiloxane precursor to the polysiloxane block of general Formula XXII (where Ar is derived from resorcinol) is copolymerized with an aromatic diacid dichloride, an ester linked structure is formed as shown in Formula XXIX:

Formula XXIX

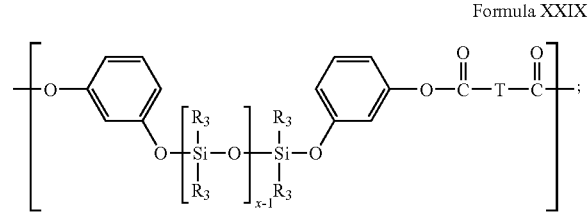

or, where a hydroxyaromatic end-capped polysiloxane precursor to the polysiloxane block of general Formula XXII (where Ar is the reaction product of resorcinol) is copolymerized with a carbonate precursor or haloformate, a carbonate linked structure is formed as shown in Formula XXX:

Formula XXX

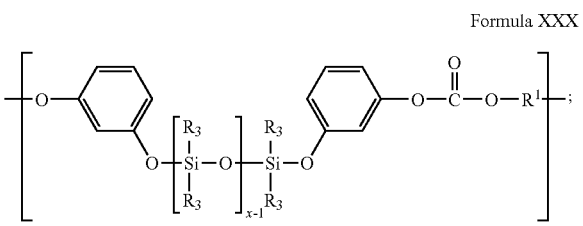

wherein for both Formulas XXIX and XXX, $R_3$ and x are as described for Formula XXII, above; T in Formula XXVII is a $C_{6-30}$ arylene group; and $R^1$ in Formula XXVIII is a $C_{6-30}$ arylene group. In an embodiment, T is derived from the reaction product of a reactive derivative of isophthalic and/or terephthalic acid. In an embodiment, $R^1$ is derived from the carbonate reaction product of a resorcinol of Formula I, or a combination of a resorcinol of Formula I and a bisphenol of Formula VIII.

In a specific embodiment, where a hydroxyaromatic end-capped polysiloxane precursor to the polysiloxane block of general Formula XIX is copolymerized with an aromatic diacid dichloride, an ester linked polysiloxane structure is formed as shown in Formula XXXI:

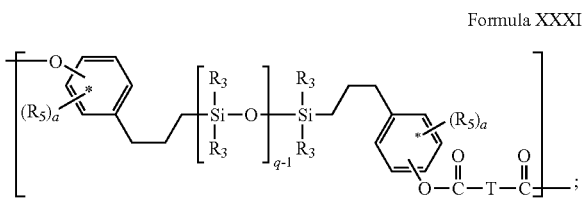

Formula XXXI or where a hydroxyaromatic end-capped polysiloxane precursor to the polysiloxane block of general Formula XIX is copolymerized with a carbonate precursor or haloformate, a carbonate linked polysiloxane structure is formed as shown in Formula XXXII:

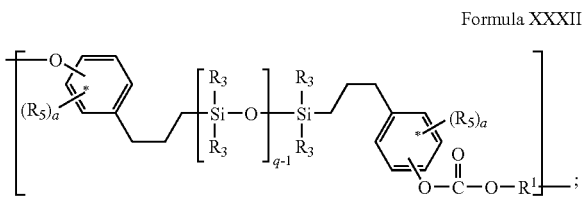

Formula XXXII or a combination comprising these polysiloxanes, wherein for both Formulas XXXI and XXXII, $R_3$ and q are as described for Formula XIX, and $R_5$ and a are as described for Formula XX, above; T in Formula XXXI is a $C_{6-30}$ arylene group; and $R^1$ in Formula XXXII is a $C_{6-30}$ arylene group. In an embodiment, T is derived from the reaction product of a reactive derivative of isophthalic and/or terephthalic acid. As in Formula XX, the arylene portions of Formulas XXXI and XXXII each have connectivity to both of: an oxygen atom, which provides connectivity to the adjacent arylate polyester units and/or aromatic carbonate units and is derived from a hydroxy group; and the alkylene portion of the polysiloxane end group which further has connectivity to both the terminal silicon atom of the polysiloxane portion, and the arylene portion. In an embodiment, the oxygen atom and the alkylene group connecting the arylene portion to the terminal silicon atom of the polysiloxane block may be disposed ortho, meta, or para to each other on the arylene portions of Formulas XXXI or XXXII. In an embodiment, $R^1$ is derived from the carbonate reaction product of a resorcinol of Formula I, or a combination of a resorcinol of Formula I and a bisphenol of Formula VIII.

In one embodiment, the bis-haloformate of a dihydroxy compound comprising a polysiloxane block is combined with a bis-haloformate comprising an arylene polyester unit, and the combined bis-haloformates are reacted with a dihydroxy compound to form a copolymer composition. For example, the reacting may be conducted using a catalyst and at a pH of 8 to 13, more specifically 8 to 11. Alternatively, the bis-haloformate of a dihydroxy compound of Formula VIII is present during the reacting of the bis-haloformates with a dihydroxy compound to form a copolymer composition. In another alternative, a mono-haloformate of a dihydroxy compound of Formula VIII is present during the reacting of the bis-haloformates with a dihydroxy compound to form a copolymer composition. In yet another alternative, the bis-haloformates are combined with a dihydroxy compound and a carbonyl halide to form a copolymer composition.

In a specific embodiment, suitable methods for forming a copolymer composition comprising a polysiloxane block are disclosed. In one method, for example, a dihydroxy aromatic compound, a chain stopper, a catalyst, a dicarboxylic acid dihalide, and solvent are combined in a medium, wherein the pH of the medium is maintained at 8 or less while combining and is biphasic, having a solvent phase and an aqueous phase. The pH is then adjusted to 7, and a polysiloxane block comprising one or more of Formulas XIX or XXII is added to the medium, followed by addition of phosgene, wherein the pH of the medium is maintained at a pH of 8 or less. The pH is adjusted to about 7, a dihydroxy aromatic compound is added, the pH is raised to about 8 to 10, a catalyst is added, and the pH is raised to a final 8 to 12. The resulting copolymer composition may be isolated by precipitation from the medium by addition to a non-solvent.

In another method for example, a dihydroxy aromatic compound, a chain stopper, a catalyst, a dicarboxylic acid dihalide, and solvent are combined in a medium, wherein the pH of the medium is maintained at 8 or less and is biphasic, having a solvent phase and an aqueous phase. The pH is adjusted to about 7, the phases are separated and the solvent phase is combined with a polysiloxane block comprising one or more of Formulas XIX or XXII, a first dihydroxy aromatic compound, and phosgene, and the pH of the medium is maintained at a pH of 8 or less. The pH is adjusted to about 7, a second dihydroxy aromatic compound is added, the pH is raised to 8 to 10, a catalyst is added, and the pH is raised to 8 to 12. The polymer may be isolated by precipitation from the reaction medium into a non-solvent.

In another method, a dihydroxy aromatic compound, a catalyst, and a solvent are added to a medium and adjusted to pH of 7 wherein the medium is biphasic, having a solvent phase and an aqueous phase. A dicarboxylic acid dihalide in a solvent is added while maintaining a pH of 4 to 7. The pH of the medium is adjusted to about 7.4, and a dihydroxy aromatic compound, a chain stopper, a catalyst, and a first portion of phosgene while maintaining a pH of about 9. The pH is raised to about 10, and a bis-haloformate of Formula XXVI (where x is COCl and y is Cl) is added to the medium, followed by addition of a second portion of phosgene, wherein the pH of the medium is maintained at a pH of about 10. The solvent phase is separated from the aqueous phase and is washed with an aqueous acidic solution. A copolymer composition is isolated by precipitation from the solvent phase by addition of a non-solvent.

In another method, for example, a dihydroxy aromatic compound, a catalyst, and a solvent are added to a medium and adjusted to pH of 7, wherein the medium is biphasic, having a solvent phase and an aqueous phase. A dicarboxylic acid dihalide in a solvent is added while maintaining a pH of 4 to 7. The pH of the medium is adjusted to about 8 to 9, and a first portion of dihydroxy aromatic compound and a first portion of phosgene are added while maintaining a pH of 5 to 7. The pH of the medium is increased to about 10 to 10.5, a polysiloxane block comprising one or more of Formulas XIX or XXII is added to the medium, and second portion of dihydroxy aromatic compound is added. The presence of chloroformates is monitored, and upon their disappearance, a chain stopper and second portion of phosgene is added, wherein the pH of the medium is maintained at about 10. The solvent phase is separated from the aqueous phase and is washed with an aqueous acidic solution. A copolymer composition is isolated by precipitation from the solvent phase by addition of a non-solvent.

In another method, for example, a dicarboxylic acid dihalide, a polysiloxane block comprising one or more of Formulas XIX or XXII, a solvent, and a catalyst are combined with a dihydroxy aromatic compound in a medium, wherein the medium is biphasic, having a solvent phase and an aqueous phase, and the pH is adjusted to 6 to 7. A dihydroxy aromatic compound, a chain stopper, and a catalyst are added. The pH of the medium is maintained at about 9, and a first portion of phosgene is added. The pH is raised to and maintained at about 10, and second portion of phosgene is added. The solvent phase is separated from the aqueous phase and is washed with an aqueous acidic solution. A copolymer composition is isolated by precipitation from the solvent phase by addition of a non-solvent.

Adjustments to the pH may be made using an aqueous solution of a base, for example, 50% aqueous sodium hydroxide or caustic soda. The biphasic solvent medium may comprise water and a substantially non-water miscible solvent, for example, methylene chloride, chloroform or ethylene dichloride.

In a comparative example of a method detailed in Experiment 1 of U.S. Pat. No. 5,932,677, a copolymer is prepared by simultaneous phosgenation of a mixture of dihydroxy compounds in biphasic medium at pH 9 to 12. In this method, no effort is made to provide for a uniform reactivity between the dihydroxy aromatic compounds comprising an arylate polyester unit, an aromatic carbonate unit, and a polysiloxane block under the conditions of the reaction. The resulting copolymer composition appears opaque when formed into a molded film of 25 micrometer thickness.

The introduction of a polysiloxane blocks comprising a structure of Formula XIX, specifically a structure of either of Formulas XII or XVI, as a carbonate into a copolymer composition comprising a resorcinol arylate polyester unit, an aromatic carbonate unit, and a polysiloxane block, can result in dramatic increases in optical transmission, low temperature notched Izod impact strength, and weatherability, where the polysiloxane soft-block moieties are separated by at least one spacer unit having a structure of one or more of Formulas II, III, IV, V, VII, and VIII. In another embodiment, a copolymer composition comprising a bisphenol arylate polyester unit, an aromatic carbonate unit, and a polysiloxane block, where the polysiloxane blocks are separated by at least one spacer unit having a structure of one or more of Formulas II, III, IV, V, VII, and VIII has high optical transmission, and excellent melt flow and ductility properties.

The copolymer composition may be combined with other polymers, where a combination may be a blend, alloy, reaction product, mixture, or other combination. For example, a thermoplastic composition can comprise a blend of the copolymer composition and an additional polymer. The additional polymer may be any polymer, not identical to copolymer composition, that can form an intimate blend with the copolymer composition with the provision that the desired properties of the copolymer composition, and the thermoplastic composition prepared therefrom, are not significantly adversely affected. In an embodiment, the copolymer composition can be blended with a polycarbonate, polyester, polyester-polycarbonate, polysiloxane-polycarbonate, polysiloxane-polyester-polycarbonate, impact modifier, or a combination comprising at least one of the foregoing polymers. In a specific embodiment, the additional polymer has a composition that is identical to the polyarylate portion of the copolymer composition. In another embodiment, the copolymer composition comprises other additives as disclosed herein above.

The thermoplastic composition can have a high transparency. In an embodiment, a molded article having a thickness of 3.2±0.12 millimeters, and consisting of the thermoplastic composition, has a percent transmittance of greater than or equal to 70%, specifically greater than or equal to 75%, and more specifically greater than or equal to 80%, according to ASTM D1003-00.

In an embodiment, a molded article having a thickness of 3.2±0.12 millimeters, and consisting of the thermoplastic composition, has a haze of less than or equal to 5%, specifically less than or equal to 4%, and more specifically less than or equal to 3%, according to ASTM D1003-00.

In one embodiment, the thermoplastic composition (or articles prepared therefrom) may exhibit one or more of the following desirable properties: a percent transmission of at least 60%, specifically at least 70%, and more specifically at least 80%, measured according to ASTM D1003-00 at a sample thickness of 3.2 millimeters; a percent haze of less than or equal to 20%, specifically less than or equal to 10%, and more specifically less than or equal to 5%, as measured according to ASTM D1003-00 at a sample thickness of 3.2 millimeters; a melt volume ratio (MVR) of 1 to 45, more specifically 2 to 30 cm$^3$/10 minutes, measured at 300° C. under a load of 1.2 kg in accordance with ASTM D1238-04.

The poly(resorcinol arylate polysiloxane polycarbonate) may further have a heat deformation temperature (HDT) of 100 to 170° C., more specifically 110 to 160° C., measured at 0.45 Mega-Pascals (MPa) according to ISO 179. The poly(resorcinol arylate polysiloxane polycarbonate) may have a notched Izod impact strength of 4.3 to 10 Joules per centimeter (J/cm), more specifically 4.8 to 7.5 J/cm, measured according to ASTM D256-04 at 23° C.; a notched Izod impact strength of 2.7 to 8.0 Joules per centimeter (J/cm), more specifically at least 3.7 to 6.4 J/cm, measured according to ASTM D256-04 at −20° C.; and a notched Izod impact strength of 2.1 to 5.3 Joules per centimeter (J/cm), more specifically at least 1.6 to 4.3 J/cm, measured according to ASTM D256-04 at −40° C. The poly(resorcinol arylate polysiloxane polycarbonate) may be 80 to 100% ductile at temperatures down to −40° C. The compositions may further have % elongation of 30 to 120%, or 60 to 115%, measured in accordance with ASTM 256-04.

Shaped, formed, or molded articles comprising the copolymer compositions are also provided. The copolymer compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like.

Other representative weatherable articles that may be fabricated using the copolymer compositions provided herein include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and device; enclosures for electrical and telecommunication devices: outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; (coated helmets and personal protective equipment; coated synthetic or natural textiles; coated photographic film and photographic prints; coated painted articles; coated dyed articles; coated fluorescent articles; coated foam articles; and like applications. Additional fabrication operations may be performed on articles, such as, but not limited to molding, in-mold decoration, baking in a paint oven, lamination, and/or thermoforming.

EXAMPLES

The invention is illustrated by the following, non-limiting examples. All parts are by weight unless otherwise designated. GPC data was acquired using an Agilent 1100 Series chromatograph equipped with a UV detector using chloroform as the mobile phase and polystyrene as molecular weight standards. Alternatively, another GPC (Waters Inc. UV detection system) with 100% methylene chloride (toluene flow marker) was used at 1.5 ml per minute on two Polymer Labs Mixed C size exclusion columns connected in series and held at 32° C., calibrated using polycarbonate standards, and analyzed by Waters. Inc. Millennium® software. Glass transition temperature (Tg) was determined using differential scanning calorimetry at a scan rate of 10° C. or 20° C./minute. All pH measurements were performed using a pH meter and probe, calibrated to standardized buffer solutions.

The compositions are tested for the following properties: Transmittance (also referred to as "transmission") (%) was determined according to ASTM D1003-00 using a Gardner Haze Guard Dual, on 3.2±0.12 or 1.6±0.12 millimeter thick molded plaques. Notched Izod Impact (NII) strength and % ductility were measured according to ISO 180-1A on 4±0.12 and 3.2±0.12 millimeter thick test bars and at various temperatures (see ASTM D256-04 for NII testing at 23° C.).

Methods for preparation of polymers of the present disclosure are provided as Examples 6-18, below. For each of the general procedures described as Examples 6-18, reactions were performed using a polycondensation reactor comprising either of a two-liter, five neck Morton flask equipped with mechanical stirrer, reflux condenser, pH probe, acid chloride solution inlet and base solution inlet, or a similarly outfitted five-liter flask. Additionally, two peristaltic pumps were used for metered delivery of acid chloride and base solutions, respectively. Alternatively, the acid chloride was metered into the reaction flask using a graduated addition funnel. The presence of chloroformates was determined by applying a small amount of the reaction mixture to phosgene test paper. The formation of an orange color indicates the presents of chloroformates.

Example 6. Procedure 1 for the preparation of poly(resorcinol arylate polysiloxane polycarbonate). The following were added to a two-liter five-necked glass reactor: resorcinol (35.25 g, 0.32 mol); deionized water (50-70 ml); anhydrous methylene chloride, HPLC grade (450 ml); para-cumyl phenol (1.74 g, 0.008 mol); and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) was then added over a period of 10-20 minutes while the pH of the reaction was maintained at 4 to 8 with the addition of 50 wt % sodium hydroxide solution in water. After addition of the diacid chloride, the pH of the reaction was adjusted to 7. The polyarylate mixture was charged with a polysiloxane of Formula XII (5.96 g, 1.8 mmol); deionized water (200 ml), and phosgene (9.7 g, 1.0 g/min., 0.10 mol) while the pH was maintained at 4 to 8 by the addition of a 50 wt % sodium hydroxide solution in water. After the complete addition of phosgene, the reaction medium was brought to a pH of 7 by the addition of sodium hydroxide solution. The contents of the reactor were checked for the presence of chloroformate molecules with phosgene paper. To the bis-chloroformate solution was added bisphenol-A (14.04 g, 0.0615 mol) and methylene chloride (200 ml), and the pH was raised to 9 to 10. The reaction was stirred for 10-15 minutes. Triethylamine (1.3 g, 0.013 mol) was added, the pH was adjusted to 9 to 12, and the contents were stirred until all of the chloroformate groups had reacted. The poly(resorcinol arylate polysiloxane polycarbonate) was purified and dried by the conventional methods used in the production of polycarbonate.

Example 7. Procedure 2 for the preparation of poly(resorcinol arylate polysiloxane polycarbonate). The following were added to a two-liter five-necked round bottom polycondensation reactor: resorcinol (29.83 g, 0.27 mol); deionized water (50-70 ml); anhydrous methylene chloride, HPLC grade (450 ml); para-cumyl phenol (1.74 g, 0.008 mol); and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) was then added over a period of 10-20 minutes while the pH of the reaction was maintained at 4 to 8 with the addition of 50% by wt. sodium hydroxide solution in water. After the complete addition of the diacid chloride, the pH of the reaction was adjusted to 7, and the organic layer containing the polyarylate was extracted from the aqueous layer. The aqueous layer was discarded, and the organic-soluble contents were transferred back into the two-liter five-necked glass reactor. The polyarylate mixture was charged with polysiloxane of Formula XII (5.16 g, 1.58 mmol; q is appx. 40); BPA (3.09 g, 0.0135 mol); deionized water (400 ml), and phosgene (5.1 g, 0.05 mol; 1.0 g/min.) while the pH was maintained at 4 to 8 by the addition of a 50% by wt. sodium hydroxide solution in water. After the complete addition of phosgene, the reaction medium was brought to a pH of 7 by the addition of sodium hydroxide solution. The presence of chloroformates in the reaction mixture was confirmed by the use of phosgene test paper. To the bis-chloroformate solution was added a second charge of BPA (3.09 g, 0.0135 mol) and methylene chloride (200 ml), and the pH was raised to 10. The reaction was stirred for 10-15 minutes. Triethylamine (1.15 g, 0.01 mol) was added and the contents were stirred until all of the chloroformate molecules had reacted. The poly(resorcinol arylate polysiloxane polycarbonate) was purified and dried by the conventional methods used in the production of polycarbonate.

Example 8. Example 7 was repeated with the following reaction conditions: resorcinol (35.25 g, 0.32 mol); deionized water (50-70 ml); anhydrous methylene chloride, HPLC grade (450 ml); para-cumyl phenol (1.74 g, 0.008 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) was added to the reactor over a period of 10-15 minutes via an addition funnel while the pH of the reaction was maintained at 4 to 8 with the addition of 50% by wt. sodium hydroxide solution in water. After the complete addition of the diacid chloride, the pH of the reaction was adjusted to 7, and the organic layer containing the polyarylate was extracted from the aqueous layer. The aqueous layer was discarded, and the organic-soluble contents were transferred back into the two-liter five-necked glass reactor. After the polyester condensation, the polyarylate mixture was charged with polysiloxane of Formula XII (2.74 g, 0.84 mmol; q is appx. 40); deionized water (400 ml), and phosgene (9.6 g, 0.10 mol; 1.0 g/min). To the bis-chloroformate solution was added BPA (6.23 g, 0.0273 mol) and methylene chloride (200 ml), and the pH was raised to 10. The reaction was stirred for 10-15 minutes. Triethylamine (1.15 g, 0.01 mol) was added and the contents were stirred until all of the chloroformates had reacted. The poly(resorcinol arylate polysiloxane polycarbonate) was purified and dried by the conventional methods used in the production of polycarbonate.

Example 9. Example 7 was repeated with the following reaction conditions: resorcinol (29.83 g, 0.27 mol); deionized water (50-70 ml); anhydrous methylene chloride, HPLC grade (450 ml) para-cumyl phenol (1.96 g, 0.009 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) while the pH of the reaction was maintained at 4 to 8 with the addition of 50% by wt. sodium hydroxide solution in water. After the complete addition of the diacid chloride, the pH of the reaction was adjusted to 7, and the organic layer containing the polyarylate was extracted from the aqueous layer. The aqueous layer was discarded, and the organic-soluble contents were transferred back into the two-liter five-necked glass reactor. After the polyester condensation, the polyarylate mixture was charged with a polysiloxane of Formula XII (2.81 g, 0.0009 mol; q is appx. 45); BPA (7.02 g, 0.0307 mol) deionized water (400 ml), and phosgene (7.4 g, 0.07 mol; 1.0 g/min.). To the bis-chloroformate solution was added a second charge of BPA (7.02 g, 0.0307 mol) and methylene chloride (200 ml), and the pH was raised to 10. The reaction was stirred for 10-15 minutes. Triethylamine (1.29 g, 0.013 mol) was added and the contents were stirred until all of the chloroformate molecules had condensed. The poly(resorcinol arylate polysiloxane polycarbonate) was purified and dried by the conventional methods used in the production of polycarbonate.

Example 10. Example 7 was repeated with the following reaction conditions: resorcinol (29.83 g, 0.27 mol); deionized water (50-70 ml); anhydrous methylene chloride, HPLC grade (450 ml); para-cumyl phenol (1.75 g, 0.008 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g, 0.25 mol of diacid chloride) was charged into the flask via an addition funnel while the pH of the reaction was maintained at 4 to 8 with the addition of 50% by wt. sodium hydroxide solution in water. After the complete addition of the diacid chloride, the pH of the reaction was adjusted to 7, and the organic layer containing the polyarylate was extracted from the aqueous layer. The aqueous layer was discarded, and the organic-soluble contents were transferred back into the two-liter five-necked glass reactor. After the polyester condensation, the polyarylate mixture was charged with a polysiloxane of Formula XII (5.16 g, 1.58 mmol; q is appx. 40); BPA (3.11 g, 0.0136 mol); deionized water (400 ml), and phosgene (5.3 g, 0.05 mol; 1.0 g/min). To the bis-chloroformate solution was added a second charge of BPA (3.11 g, 0.014 mol) and methylene chloride (200 ml), and the pH was raised to 10. The reaction was stirred for 10-15 minutes. Triethylamine (1.16 g, 0.01 mol) was added and the contents were stirred until all of the chloroformate molecules had condensed. The poly(resorcinol arylate polysiloxane polycarbonate) was purified and dried by the conventional methods used in the production of polycarbonate.

Example 11. Example 7 was repeated with the following reaction conditions: resorcinol (35.25 g, 0.32 mol); deionized water (50-70 ml); anhydrous methylene chloride, HPLC grade (450 ml); para-cumyl phenol (1.96 g, 0.009 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g, 0.25 mol of diacid chloride) was added over a period of 10-15 minutes while the pH of the reaction was maintained at 4 to 8 with the addition of 50% by wt. sodium hydroxide solution in water. After the complete addition of the diacid chloride, the pH of the reaction was adjusted to 7, and the organic layer containing the polyarylate was extracted from the aqueous layer. The aqueous layer was discarded, and the organic-soluble contents were transferred back into the two-liter five-necked glass reactor. After the polyester condensation, the polyarylate mixture was charged with a polysiloxane of Formula XII (2.81 g, 0.86 mmol; q is appx. 40); BPA (7.02 g, 0.0308 mol) deionized water (400 ml), and phosgene (13.7 g, 0.139 mol; 1.0 g/min). To the bis-chloroformate solution was added a second charge of BPA (7.02 g, 0.0308 mol) and methylene chloride (200 ml), and the pH was raised to 10. The reaction was stirred for 10-15 minutes. Triethylamine (1.30 g, 0.013 mol) was added and the contents were stirred until all of the chloroformate molecules had condensed. The poly(resorcinol arylate polysiloxane polycarbonate) was purified and dried by the conventional methods used in the production of polycarbonate.

Example 12. Example 6 was repeated with the following reaction conditions: resorcinol (35.25 g, 0.32 mol); deionized water (50-70 ml); anhydrous methylene chloride, HPLC grade (450 ml); para-cumyl phenol (2.29 g, 0.011 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) was added over 10-20 min. while the pH of the reaction was maintained at 4 to 8 with the addition of 50 wt % sodium hydroxide solution in water. After addition of the diacid chloride, the pH of the reaction was adjusted to 7. After the polyester condensation, the polyarylate mixture was charged with a polysiloxane of Formula XII (2.98 g, 0.91 mmol; q is appx. 40); BPA (7.02 g, 0.0307 mol); deionized water (400 ml), and phosgene (9.6 g, 0.10 mol; 1.0 g/min). To the bis-chloroformate solution was added a second charge of BPA (7.02 g, 0.0307 mol) and methylene chloride (200 ml), and the pH was raised to 10. The reaction was stirred for 10-15 minutes. Triethylamine (1.30 g, 0.013 mol) was added and the contents were stirred until all of the chloroformate groups had reacted. The poly(resorcinol arylate polysiloxane polycarbonate) was purified and dried by the conventional methods used in the production of polycarbonate.

Example 13. Example 6 was repeated with the following reaction conditions: resorcinol (35.25 g, 0.32 mol); deionized water (50-70 ml); anhydrous methylene chloride, HPLC grade (450 ml); para-cumyl phenol (1.75 g, 0.008 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) was added to the reactor over a period of 10-15 minutes via an addition funnel while the pH of the reaction was maintained at 4 to 8 with the addition of 50 wt % sodium hydroxide solution in water. After addition of the diacid chloride, the pH of the reaction was adjusted to 7. After the polyester condensation, the polyarylate mixture was charged with a polysiloxane of Formula XII (5.49 g, 1.68 mmol; q is appx. 40); BPA (3.09 g, 0.0135 mol); deionized water (400 ml), and phosgene (11.44 g, 0.116 mol; 1.0 g/min). To the bis-chloroformate solution was added a second charge of BPA (3.09 g, 0.0135 mol) and methylene chloride (200 ml), and the pH was raised to 10. The reaction was stirred for 10-15 minutes. Triethylamine (1.16 g, 0.01 mol) was added and the contents were stirred until all of the chloroformate had condensed. The poly(resorcinol arylate polysiloxane polycarbonate) was purified and dried by the conventional methods used in the production of polycarbonate.

Example 14. Example 6 was repeated with the following reaction conditions: resorcinol (29.83 g, 0.27 mol); deionized water (50-70 ml); anhydrous methylene chloride, HPLC grade (450 ml); para-cumyl phenol (2.62 g, 0.012 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g, 0.25 mol of diacid chloride) was added to the reactor over a period of 10-15 minutes via an addition funnel while the pH of the reaction was maintained at 4 to 8 with the addition of 50 wt % sodium hydroxide solution in water. After addition of the diacid chloride, the pH of the reaction was adjusted to 7. After the polyester condensation, the polyarylate mixture was charged with a polysiloxane of Formula XII (7.03 g, 2.15 mmol; q is appx. 40); BPA (18.7 g 0.082 mol); deionized water (400 ml), and phosgene (13.98 g, 0.141 mol; 1.0 g/min). To the bis-chloroformate solution was added a second charge of BPA (18.7 g 0.082 mol) and methylene chloride (200 ml), and the pH was raised to 10. The reaction was stirred for 10-15 minutes. Triethylamine (1.74 g, 0.012 mol) was added and the contents were stirred until all of the chloroformate groups had condensed. The poly(resorcinol arylate polysiloxane polycarbonate) was purified and dried by the conventional methods used in the production of polycarbonate.

Example 15. Example 7 was repeated with the following reaction conditions: resorcinol (35.25 g, 0.32 mol); deionized water (50-70 ml); anhydrous methylene chloride, HPLC grade (450 ml); para-cumyl phenol (2.62 g, 0.012 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) was added to the reactor over a period of 10-15 minutes via an addition funnel while the pH of the reaction was maintained at 4 to 8 with the addition of 50 wt % sodium hydroxide solution in water. After addition of the diacid chloride, the pH of the reaction was adjusted to 7. After the polyester condensation, the polyarylate mixture was charged with a polysiloxane of Formula XII (7.03 g, 2.15 mmol; q is appx. 40); BPA (18.7 g, 0.082 mol); deionized water (400 ml), and phosgene (20.31 g, 0.205 mol; 1.0 g/min). To the bis-chloroformate solution was added a second charge of BPA (18.7 g, 0.082 mol) and methylene chloride (200 ml), and the pH was raised to 10. The reaction was stirred for 10-15 minutes. Triethylamine (1.74 g, 0.012 mol) was added and the contents were stirred until all of the chloroformate molecules were judged to be absent by an analytical method. The poly (resorcinol arylate polysiloxane polycarbonate) was purified and dried by the conventional methods used in the production of polycarbonate.

Example 16. Procedure 3 for the preparation of poly(resorcinol arylate polysiloxane polycarbonate). A five-liter Morton flask was charged with resorcinol (238 g, 2.16 mol), methylene chloride (2 L), water (400 ml) and triethylamine (11 ml, 0.079 mol). The pH was adjusted to 7 with 50 wt % aqueous sodium hydroxide, and maintained at pH 4 to 7 by base addition as a 25 wt % methylene chloride solution of a 50/50 molar ratio of isophthaloyl and terephthaloyl chlorides (1351 g of solution, 338 g, 1.67 mol) was added over a 13 minute period. The pH was raised to 7.4 and the reaction mixture was added to a 30 L phosgenator along with BPA (1824 g, 8.00 mol.), methylene chloride (6 L), water (3.5 L), phenol (49.9 g, 0.53 mol, 4.5 mol %) and triethylamine (5.5 ml, 0.039 mol). The reaction mixture was treated with phosgene while maintaining the pH at about 9 with 50 wt % aqueous sodium hydroxide. At 410 g (4.13 mol) of phosgene the pH was raised to 10 and the addition of a 24 wt % solution of Formula XXVI (where x=COCl, y=Cl and q is appx 49) (EuSi-BCF) in methylene chloride (585 g of solution, 140 g (ca. 0.034 mol) of EuSi-BCF) was started. The addition of the siloxane solution was complete at 590 g (6.0 mol) of phosgene. The phosgenation was continued at pH 10 until 1,000 g (10.0 mol) of phosgene was added. The polymer solution was diluted with 8 L of methylene chloride washed 2 times with 1N hydrochloric acid and 3 times with deionized water. The polymer was isolated by anti-solvent precipitation into methanol and dried in a vacuum oven at 100° C.

Example 17. Procedure 4 for the preparation of poly(resorcinol arylate polysiloxane polycarbonate). A five-liter Morton flask was charged with resorcinol (238 g, 2.16 mol), methylene chloride (2 L), water (500 ml) and a 75 wt % aqueous solution of methyltributylammonium chloride (28 ml, 0.089 mol). The pH was adjusted to 7 with 50 wt % aqueous sodium hydroxide, and maintained at pH 6 to 7 by base addition as a 25 wt % methylene chloride solution of a 50/50 molar ratio of isophthaloyl and terephthaloyl chlorides (1351 g of solution, 338 g, 1.67 mol) was added over a 12 min period. The pH was raised to 8.3 and the reaction mixture was added to a 30 L phosgenator along with BPA (913 g, 4.00 mol.), methylene chloride (7.5 L) and water (3.8 L). The reaction mixture was treated with phosgene while maintaining the pH at about 5 to 7 with 50 wt % aqueous sodium hydroxide. At 610 g (6.2 mol) of phosgene, the phosgene was stopped and the pH was raised to 10.2 followed by the addition of a polysiloxane of Formula XII (141 g, appx 0.034 mol; q is appx. 49). The reaction mixture was stirred at pH 10.2 for 10 minutes followed by the addition of BPA (913 g, 4.00 mol). Once the chloroformates were gone (about 7 min), phenol (49.9 g, 0.53 mol, 4.5 mol %) and triethylamine (11 ml, 0.079 mol) were added, and the phosgenation was continued at pH 10 until an additional 500 g (5 mol) of phosgene was added. The polymer solution was diluted with 8 L of methylene chloride washed 2 times with 1N hydrochloric acid and 3 times with deionized water. The polymer was isolated by anti-solvent precipitation into methanol and dried in a vacuum oven at 100° C.

Example 18. Procedure 6 for the preparation of poly(resorcinol arylate polysiloxane polycarbonate): A 3 L Morton flask was charged with a 25 wt % methylene chloride solution of a 50/50 molar ratio of isophthaloyl and terephthaloyl chloride (1351 g of solution, 338 g, 1.67 mol. of the diacid chloride mixture). To this was added, over a 4 minute period, a 20-30 wt % solution of XII in methylene chloride (141 g, about 0.034 mol; q is appx. 49) and triethylamine (11 ml, 0.79 mol). The reaction was stirred for 10 minutes and then added over a 23 minute period to a five-liter Morton flask that was pre-charged with resorcinol (238 g, 2.16 mol), methylene chloride (2 L), water (400 ml) and triethylamine (11 ml, 0.079 mol). The pH was maintained at 6-7 with 50 wt % aqueous sodium hydroxide during the addition. The pH was raised to 6.8 and the reaction mixture was added to a 30 L phosgenator along with BPA (1824 g, 8.00 mol.), methylene chloride (6 L), water (3.5 L), phenol (49.9 g, 0.53 mol, 4.5 mol %), and triethylamine (5.5 ml, 0.039 mol). The reaction mixture was treated with phosgene while maintaining the pH at ca. 9 with 50 wt % aqueous sodium hydroxide. At 410 g (4.13 mol) of phosgene the pH was raised to 10 and phosgene was continued to 1,000 g (10.0 mol). The polymer solution was diluted with 8 L of methylene chloride washed 2 times with 1N hydrochloric acid and 3 times with deionized water. The polymer was isolated by precipitation into methanol and dried in a vacuum oven at 100° C.

Example 19. Procedure for preparation of poly(resorcinol arylate polysiloxane polycarbonate). The following are added to a two-liter five-necked glass reactor under nitrogen atmosphere: resorcinol (35.25 g, 0.32 mol); deionized water (50-70 ml); methylene chloride (450 ml); para-cumyl phenol (1.74 g, 0.008 mol); and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) is then added over a period of 10-20 minutes while the pH of the reaction is maintained at 4 to 8 with the addition of 50 wt % sodium hydroxide solution in water. After addition of the diacid chloride, the pH of the reaction is adjusted to 7 and the mixture is stirred for 5 min. The polyarylate mixture is charged with a polysiloxane of Formula XII (5.96 g, 1.8 mmol; q is appx. 40); deionized water (200 ml), and phosgene (16.7 g, 0.17 mol; 1.0 g/min) while the pH is maintained at 4 to 8 by the addition of a 50 wt % sodium hydroxide solution in water. After the complete addition of phosgene, the reaction medium is brought to a pH of 7 by the addition of sodium hydroxide solution. The presence of chloroformates in the reaction mixture is confirmed with phosgene paper. To the chloroformate solution is added bisphenol-A (14.04 g, 0.0615 mol) and methylene chloride (200 ml), and the pH is raised to 8.5 to 10. The reaction is stirred for 10-15 minutes. Triethylamine (1.3 g, 0.013 mol) is then added. The mixture is stirred while the pH is maintained at 9 to 10 with sodium hydroxide until chloroformates cannot be detected by phosgene paper. Phosgene (4 g at appx. 1 g/min) is then added to the mixture while the pH is maintained a 9-10 with sodium hydroxide. After stirring at pH 10 for several min, the pH is lower to ~7-8 with dilute hydrochloric acid and the poly (resorcinol arylate polysiloxane polycarbonate) is purified and dried by the conventional methods used in the production of polycarbonate.

Example 20. Procedure for preparation of poly(resorcinol arylate polysiloxane polycarbonate). The following are added to a two-liter five-necked round bottom polycondensation reactor under a nitrogen atmosphere: resorcinol (31.7 g, 0.288 mol); deionized water (50-70 ml); methylene chloride (450 ml) para-cumyl phenol (1.96 g, 0.009 mol) and methyltributylammonium chloride (0.3 ml of a 75 weight percent solution in water). A solution of a 50:50 mixture by weight of isophthaloyl and terephthaloyl chlorides dissolved in anhydrous methylene chloride (150.1 g of solution, 0.25 mol of diacid chloride) is added while the pH of the reaction is maintained at 4 to 8 with the addition of 50% by wt. sodium hydroxide solution in water. After the complete addition of the diacid chloride, the pH of the reaction is adjusted to 8. The mixture is stirred for 5 min after which time the organic layer containing the polyarylate is extracted from the aqueous layer. The aqueous layer is discarded, and the organic-soluble contents are transferred back into the two-liter five-necked glass reactor. After the polyester condensation, the polyarylate mixture is charged with a polysiloxane of Formula XII (2.81 g, 0.86 mmol; q is appx. 40); BPA (7.02 g, 0.0307 mol) deionized water (400 ml), and phosgene (11.6 g, 1.0 g/min., 0.12 mol). To the chloroformate solution is added a second charge of BPA (7.02 g, 0.0307 mol) and methylene chloride (200 ml), and the pH is raised to 9. The reaction is stirred for 10-15 minutes. Triethylamine (1.29 g, 0.013 mol) is added and the contents are stirred at pH 9 to 10.5 until the presence of chloroformates cannot be detected with phosgene paper. Phosgene (4 g at ~1 g/min) is then added to the mixture while the pH is maintained a 9-10 with sodium hydroxide. After stirring at pH 10 for several min, the pH is lowered to appx. 7-8 with dilute hydrochloric acid and the poly(resorcinol arylate polysiloxane polycarbonate) is purified and dried by the conventional methods used in the production of polycarbonate.

Comparative Example 1. Procedure 5 for the preparation of poly(resorcinol arylate polysiloxane polycarbonate): A five-liter Morton flask was charged with resorcinol (238 g, 2.16 mol), methylene chloride (2 L), water (400 ml) and triethylamine (11 ml, 0.079 mol). The pH was adjusted to 7 with 50 wt % aqueous sodium hydroxide, and maintained at pH 4.5 to 7.5 by base addition as a 25 wt % methylene chloride solution of a 50/50 molar ratio of isophthaloyl and terephthaloyl chlorides (1351 g of solution, 338 g, 1.67 mol) was added over an 11 min period. The pH was raised to 6.8 and the reaction mixture was added to a 30 L phosgenator along with BPA (1824 g, 8.00 mol.), methylene chloride (6 L), water (3.5 L), phenol (49.9 g, 0.53 mol, 4.5 mol %), a polysiloxane of Formula XII (141 g, appx. 0.034 mol; q is appx. 49) and triethylamine (5.5 ml, 0.039 mol). The reaction mixture was treated with phosgene while maintaining the pH at ~9 with 50 wt % aqueous sodium hydroxide. At 410 g (4.13 mol) of phosgene the pH was raised to 10 and phosgene was continued to 1050 g (10.5 mol). The polymer solution was diluted with 8 L of methylene chloride washed 2 times with 1N hydrochloric acid and 3 times with deionized water. The polymer was isolated by anti-solvent precipitation into methanol and dried in a vacuum oven at 100° C.

Comparative Example 2. The following components were charged into a five-liter Morton round bottom flask: resorcinol (29.83 g, 0.27 mol); (b) deionized water (50 to 70 ml); (c) methylene chloride (450 ml) (d) para-cumyl phenol (2.62 g, 0.012 mol). A solution of a 50:50 mixture by weight of isophthaloyl and terephthaloyl chlorides dissolved in anhydrous methylene chloride (150.1 g of solution, 0.25 mol of diacid chloride) was added to the flask while the pH was maintained at 4 to 8. After the polyester condensation, the polyarylate mixture was charged with (a) a polysiloxane of Formula XII (7.03 g, 2.15 mmol; q is appx. 40); (b) BPA (18.7 g, 0.082 mol); (c) deionized water (400 ml), and (d) phosgene (13.98 g, 1.0 g/min., 0.141 mol), and (e) triethylamine (1.74 g, 0.012 mol). The reaction was stirred for the required reaction time and until chloroformate could not be detected with phosgene paper. The poly(resorcinol arylate polysiloxane polycarbonate) was purified and dried by the conventional methods used in the production of polycarbonate.

Comparative Example 3. Experiment 1 of U.S. Pat. No. 5,932,677 was repeated on a smaller scale, similar to Examples 1-10 and Comparative Example 2. The following components were charged into a five-liter Morton round bottom flask similar to the reactor described in Ex. 1: (a) deionized water (50 to 70 ml); (b) methylene chloride (450 ml) (c) para-cumyl phenol (1.61 g, 0.0065 mol), (d) BPA (26.95 g, 0.118 mol), (e) a polysiloxane of Formula XII (1.41 g, 0.0004 mol; q is appx. 40), and (f) triethylamine (0.91 g, 0.0065 mol). A solution of a 93:7 mixture of isophthaloyl and terephthaloyl chlorides dissolved in anhydrous methylene chloride (20 g, 0.0985 mol of diacid chloride) was added to the flask. During the polyester condensation, reaction the pH of the reaction was maintained at 8 to 10. After the addition of the diacid chloride, the reactor was charged with phosgene (2.58 g, 0.026 mol). The reaction was stirred for the required reaction time and until all of the chloroformate were gone. The poly (resorcinol arylate polysiloxane polycarbonate) was purified and dried by the conventional methods used in the production of polycarbonate.

Properties of the poly(resorcinol arylate polysiloxane polycarbonate)s prepared according to the above methods are tabulated in Table I, below, wherein Mw is molecular weight, Tg is the glass transition temperature, film appearance is a qualitative visual assessment, and % T is the percent transmittance.

TABLE I

| Sample | wt. % XII | Mw (g/mol) | Tg (° C.) | Film appearance | % T |
|---|---|---|---|---|---|
| Example 6 | 6 | 23,300 | 130.6 | transparent | 91.1[a] |
| Example 7 | 6 | 28,900 | 146.5 | transparent | 90.8[a] |
| Example 8 | 3 | 25,700 | 146.6 | transparent | 88.4[a] |
| Example 9 | 6 | 28,700 | 145.3 | transparent | 90.6[a] |
| Example 10 | 6 | 30,000 | 148.9 | transparent | 87.5[a] |
| Example 11 | 3 | 25,000 | 142.7 | transparent | 92.3[a] |
| Example 12 | 3 | 25,800 | 135.3 | transparent | 90.3[a] |
| Example 13 | 6 | 30,400 | 135.7 | transparent | 92[a] |
| Example 14 | 6 | 31,600 | 146.2 | transparent | 90.7[a] |
| Example 15 | 6 | 15,900 | 131.4 | transparent | 91.7[b] |
| Example 16 | 5 | 24,000 | 138 | transparent | 74.8[b] |
| Example 17 | 6 | 31,000 | 140 | transparent | 79.5[b] |
| Example 18 | 5 | 26,400 | 138 | transparent | 87.8[b] |
| Comp. Ex. 1 | 4 | 23,700 | 139 | translucent | 30.6[b] |
| Comp. Ex. 2 | 6 | 25,700 | 140 | opaque[c] | 34.2[a] |
| Comp. Ex. 3 | 3 | 27,100 | 176 | opaque[c] | 33.1 |

[a]Films were melt-pressed at 205° C. (after drying the resin at 110-120° C. for at least 4 h.) and 13.8 megapascals to 10-30 micrometer thickness.
[b]Parts were injection molded into color plaques with 3.2 mm thickness.
[c]% haze >99%.

Low Temperature Notched Izod impact strength measurements. Low temperature impact is a distinguishing property for thermoplastic materials because often materials are exposed to a wide range of temperatures. Parts were tested for low temperature impact strength using notched Izod samples of 3.2 mm thickness. The parts were evaluated using a Testing Machines Inc. MonitorImpact Tester Model 43-02 at room temperature, −20° C., and −40° C. according to ASTM D256-04 test protocol. Five samples were tested at each temperature and the average force was recorded for each sample. Results for impact testing are in Table 2.

TABLE II

| Sample | NII impact (J/cm) @ 23° C. | NII impact (J/cm) @ −20° C. | NII impact (J/cm) @ −40° C. |
|---|---|---|---|
| Control[a] | 8.5 | 2.2 | 1.4 |
| Ex. 16 | 5.9 | 3.8 | 2.5 |
| Ex. 17 | 6.6 | 4.9 | 2.3 |
| Comp. Ex. 1 | 5.4 | 3.4 | 2.6 |
| Ex. 18 | 5.9 | 3.9 | 3.3 |

[a]Poly(resorcinol ester polycarbonate) material ($M_w$ = 28,500 g/mol) without any polysiloxane blocks made according to Example 11 but without addition of polysiloxane of Formula XII).

The poly(resorcinol arylate polysiloxane polycarbonate) samples show an enhanced low temperature impact versus the Control polyestercarbonate. It is also known that by increasing the molecular weight of the poly(resorcinol arylate polysiloxane polycarbonate), the room temperature and low temperature ductility will also increase, and with increasing the molecular weight of the control, the ductility will not improve substantially, especially at lower temperatures.

All cited patents, patent applications, and other references are incorporated herein by reference in their entirety. All ranges disclosed herein are inclusive of the endpoints, and endpoints directed to the same characteristic are independently combinable with each other.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents cited herein are incorporated herein by reference.

What is claimed is:

1. A copolymer composition comprising:
a polysiloxane block comprising siloxane units, wherein the polysiloxane block is of the formula:

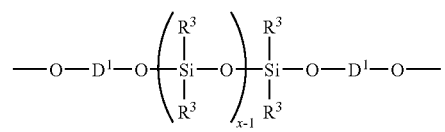

wherein x is 4 to 50, each $R^3$ is the same or different, and is $C_{1-8}$ alkyl or $C_{6-13}$ aryl; and $D^1$ is the reaction residue of a dihydroxy aromatic compound; or the polysiloxane block is of the formula:

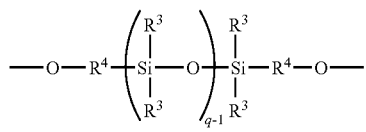

wherein q is 4 to 50; each $R^3$ is the same or different, and $R^4$ is a $C_{6-30}$ hydrocarbylene; and a polyarylate-polycarbonate block consisting essentially of arylate polyester units and aromatic carbonate units present in an amount of 50 to 99 mole percent of arylate polyester units, and
1 to 50 mole percent aromatic carbonate units, wherein
  1 to 30 mole percent of the aromatic carbonate units are resorcinol carbonate units, and
  0 to 35 mole percent of the aromatic carbonate units are bisphenol carbonate units, wherein the sum of the mole percentages of arylate polyester units and aromatic carbonate units in the arylate block is 100 mole percent, wherein the polysiloxane blocks are connected to an arylate ester unit, a aromatic carbonate unit, or both an arylate ester unit and a aromatic carbonate unit, and wherein the siloxane units of the polysiloxane block are present in an amount of 0.2 to 10 wt % based on the weight of the copolymer composition, and wherein a molded article having a thickness of 3.2±0.12 millimeters, and consisting of the copolymer composition, has a percent transmittance of greater than or equal to 70%, according to ASTM D1003-00.

2. The copolymer composition of claim 1, wherein a molded article having a thickness of 3.2±0.12 millimeters, and consisting of the copolymer composition, has a haze of less than or equal to 10%, according to ASTM D1003-00.

3. The copolymer composition of claim 1, wherein the polysiloxane block is substantially randomly dispersed with the arylate polyester units, the aromatic carbonate units, or both the arylate polyester units and aromatic carbonate units of the copolymer composition.

4. The copolymer composition of claim 1, wherein $D^1$ is the reaction residue of resorcinol, bisphenol A, or a combination of resorcinol and bisphenol A, and wherein the arylate polyester units are isophthalate-terephthalate-resorcinol ester units.

5. The copolymer composition of claim 1, wherein the siloxane units of the polysiloxane block are present in an amount of 0.2 to 6 wt % based on the weight of the copolymer composition.

6. The copolymer composition of claim 1, wherein x is 5 to 45.

7. The copolymer composition of claim 1, wherein q is 4 to 15.

8. The copolymer composition of claim 1, wherein q is 16 to 50.

9. The copolymer composition of claim 1, wherein the polysiloxane block is of the formula:

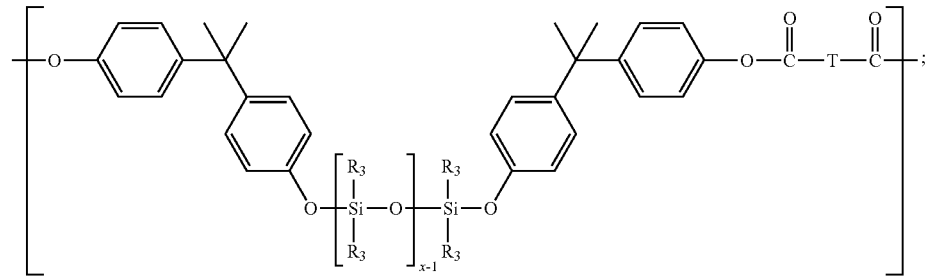

or of the formula:

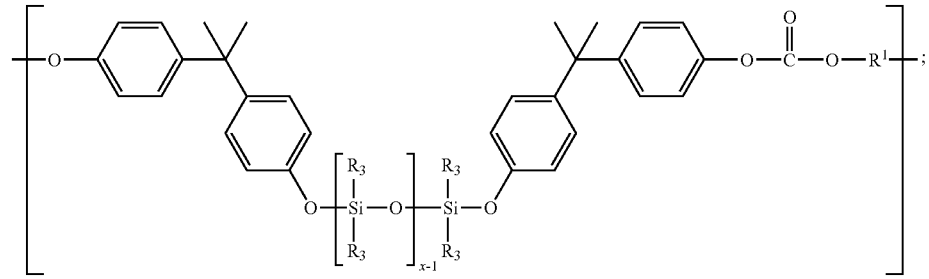

or a combination comprising these polysiloxane blocks, wherein each $R^3$ is the same or different and is $C_{1-8}$ alkyl or $C_{6-13}$ aryl, x is 4 to 50, T is a $C_{6-30}$ arylene group; and $R^1$ in is a $C_{6-30}$ arylene group.

10. The copolymer composition of claim 1, wherein the polysiloxane block is of the formula:

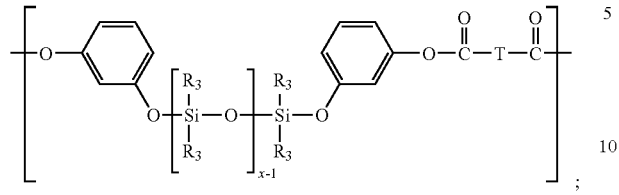

or of the formula:

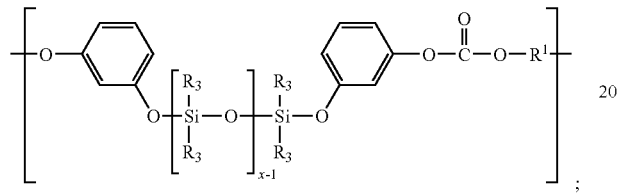

or a combination comprising these polysiloxane blocks, wherein each $R^3$ is the same or different and is $C_{1-8}$ alkyl or $C_{6-13}$ aryl, x is 4 to 50, T is a $C_{6-30}$ arylene group; and $R^1$ in is a $C_{6-30}$ arylene group.

11. The copolymer composition of claim 1, wherein the polysiloxane block is of the formula:

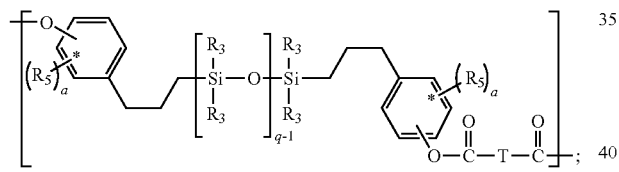

or of the formula

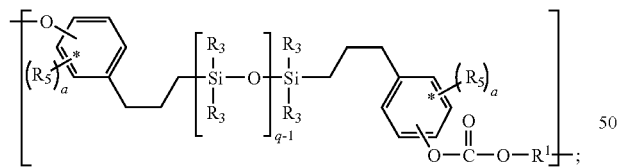

a combination comprising these polysiloxane blocks, wherein each $R^3$ is the same or different, and is $C_{1-8}$ alkyl or $C_{6-13}$ aryl; a is 0 or 1; each $R^5$ is a $C_{1-3}$ alkoxy; q is 4 to 50, T is a $C_{6-30}$ arylene group; and $R^1$ is a $C_{6-30}$ arylene group.

12. An article comprising the copolymer composition of claim 1.

13. The article of claim 12 where the article is a component for the interior of an aircraft.

14. A copolymer composition consisting essentially of:
a polysiloxane block comprising siloxane units, wherein the polysiloxane block is of the formula:

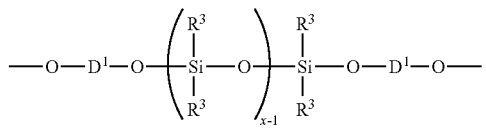

wherein x is 4 to 50, each $R^3$ is the same or different, and is $C_{1-8}$ alkyl or $C_{6-13}$ aryl; and $D^1$ is the reaction residue of a dihydroxy aromatic compound; or
the polysiloxane block is of the formula:

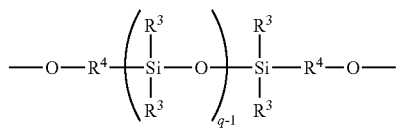

wherein q is 4 to 50; each $R^3$ is the same or different, and $R^4$ is a $C_{6-30}$ hydrocarbylene; and a polyarylate-polycarbonate block consisting essentially of arylate polyester units and aromatic carbonate units present in an amount of
  50 to 99 mole percent of arylate polyester units, and
  1 to 50 mole percent aromatic carbonate units, wherein
    1 to 30 mole percent of the aromatic carbonate units are resorcinol carbonate units, and
    0 to 35 mole percent of the aromatic carbonate units are bisphenol carbonate units,
wherein the sum of the mole percentages of arylate polyester units and aromatic carbonate units in the arylate block is 100 mole percent,
wherein the polysiloxane blocks are connected to an arylate ester unit, a aromatic carbonate unit, or both an arylate ester unit and a aromatic carbonate unit, and
wherein the siloxane units of the polysiloxane block are present in an amount of 0.2 to 10 wt % based on the weight of the copolymer composition, and
wherein a molded article having a thickness of 3.2±0.12 millimeters, and consisting of the copolymer composition, has a percent transmittance of greater than or equal to 70%, according to ASTM D1003-00.

15. A thermoplastic composition comprising a blend of:
a first polymer comprising a copolymer composition comprising:
a polysiloxane block comprising siloxane units, wherein the polysiloxane block is of the formula:

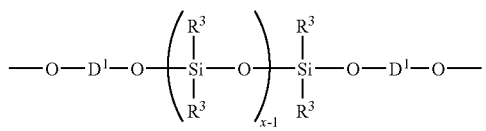

wherein x is 4 to 50, each $R^3$ is the same or different, and is $C_{1-8}$ alkyl or $C_{6-13}$ aryl; and $D^1$ is the reaction residue of a dihydroxy aromatic compound; or the polysiloxane block is of the formula:

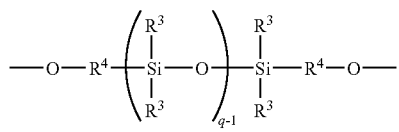

wherein q is 4 to 50; each $R^3$ is the same or different, and $R^4$ is $C_{6-30}$ hydrocarbylene; and a plyarylate-polycarbonate block consisting essentially of arylate polyester units and aromatic carbonate units present in an amount of
  50 to 99 mole percent of arylate polyester units, and
  1 to 50 mole percent aromatic carbonate units, wherein
    1 to 30 mole percent of the aromatic carbonate unit are resorcinol carbonate units, and
    0 to 35 mole percent of the aromatic carbonate units are bisphenol carbonate units,
wherein the sum of the mole percentages of arylate polyester units and aromatic carbonate units in the arylate block is 100 mole percent,
wherein the polysiloxane blocks are connected to an arylate ester unit, a aromatic carbonate unit, or both an arylate ester unit and a aromatic carbonate unit, and
wherein the siloxane units of the polysiloxane block are present in and amount of 0.2 to 10 wt % based on the weight of the copolymer composition; and
a second polymer,
wherein the first and second polymers are not identical, and
wherein a molded article having a thickness of 3.2±0.12 millimeters, and consisting of the thermoplastic composition, has a percent transmittance of greater than or equal to 70%, according to ASTM D1003-00.

16. The thermoplastic composition of claim 15, wherein the second polymer has a composition identical to the polyarylate-polycarbonate portion of the first polymer.

17. The thermoplastic composition of claim 16, further comprising an additive including colorants, pigments, dyes, impact modifiers, stabilizers, color stabilizers, heat stabilizers, UV screeners, UV absorbers, flame retardants, fillers, flow aids, ester interchange inhibitors, and mold release agents.

18. An article comprising the thermoplastic composition of claim 15.

19. The article of claim 18, wherein the article is an interior component for an aircraft.

* * * * *

UNITED STATES PATENT AND TRADEMARK OFFICE
CERTIFICATE OF CORRECTION

| | | |
|---|---|---|
| PATENT NO. | : 7,605,221 B2 | Page 1 of 1 |
| APPLICATION NO. | : 11/426680 | |
| DATED | : October 20, 2009 | |
| INVENTOR(S) | : Davis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this

Fourteenth Day of December, 2010

David J. Kappos
*Director of the United States Patent and Trademark Office*